United States Patent
Elrasad et al.

(10) Patent No.: US 11,749,004 B2
(45) Date of Patent: Sep. 5, 2023

(54) EVENT DETECTOR AND METHOD OF GENERATING TEXTURAL IMAGE BASED ON EVENT COUNT DECAY FACTOR AND NET POLARITY

(71) Applicant: FotoNation Limited, Galway (IE)

(72) Inventors: Amr Elrasad, Galway (IE); Cian Ryan, Galway (IE); Richard Blythman, Galway (IE); Joe Lemley, Galway (IE); Brian O'Sullivan, Galway (IE)

(73) Assignee: FotoNation Limited

( * ) Notice: Subject to any disclaimer, the term of this patent is extended or adjusted under 35 U.S.C. 154(b) by 0 days.

(21) Appl. No.: 17/680,095

(22) Filed: Feb. 24, 2022

(65) Prior Publication Data
US 2022/0254171 A1    Aug. 11, 2022

Related U.S. Application Data

(63) Continuation of application No. 17/037,420, filed on Sep. 29, 2020, now Pat. No. 11,270,137, which is a
(Continued)

(51) Int. Cl.
*G06V 20/59*      (2022.01)
*G06T 7/246*      (2017.01)
(Continued)

(52) U.S. Cl.
CPC ............ *G06V 20/597* (2022.01); *G06T 7/246* (2017.01); *G06T 11/001* (2013.01); *G06V 10/25* (2022.01);
(Continued)

(58) Field of Classification Search
CPC ...... G06V 20/597; G06V 10/25; G06V 20/52; G06T 7/246; G06T 2207/30268
See application file for complete search history.

(56) References Cited

U.S. PATENT DOCUMENTS 10,466,779 B1 *   11/2019   Liu ...................... G06T 19/006
2011/0293190 A1    12/2011   O'Callaghan
(Continued)

FOREIGN PATENT DOCUMENTS

EP         3440833 31      8/2019
WO    WO2019042703 A1    3/2019
(Continued)

OTHER PUBLICATIONS

X. Lagorce, G. Orchard, F. Gallupi, B. E. Shi, and R. Benosman, "HOTS: A hierarchy of event-based time-surfaces for pattern recognition," IEEE Trans. Pattern Anal. Mach. Intell., vol. 39, No. 7, pp. 1346-1359, 2017. (Year: 2017).*
(Continued)

*Primary Examiner* — Michael Robert Cammarata
(74) *Attorney, Agent, or Firm* — Lerner David LLP

(57) ABSTRACT

A method for producing a textural image from event information generated by an event camera comprises: accumulating event information from a plurality of events occurring during successive event cycles across a field of view of the event camera, each event indicating an x,y location within the field of view, a polarity for a change of detected light intensity incident at the x,y location and an event cycle at which the event occurred; in response to selected event cycles, analysing event information for one or more preceding event cycles to identify one or more regions of interest bounding a respective object to be tracked; and responsive to a threshold event criterion for a region of interest being met, generating a textural image for the region of interest from event information accumulated from within the region of interest.

19 Claims, 14 Drawing Sheets

Related U.S. Application Data continuation-in-part of application No. 16/941,799, filed on Jul. 29, 2020, now Pat. No. 11,301,702, which is a continuation-in-part of application No. 16/904,122, filed on Jun. 17, 2020, now Pat. No. 11,164,019.

(51) Int. Cl.
| | |
|---|---|
| *G06V 10/25* | (2022.01) |
| *G06V 20/52* | (2022.01) |
| *G06T 11/00* | (2006.01) |
| *H04N 7/18* | (2006.01) |

(52) U.S. Cl.
CPC ............... *G06V 20/52* (2022.01); *H04N 7/18* (2013.01); *G06T 2207/30268* (2013.01)

(56) References Cited

U.S. PATENT DOCUMENTS

| | | |
|---|---|---|
| 2013/0085642 A1 | 4/2013 | Dankers |
| 2015/0310370 A1 | 10/2015 | Burry et al. |
| 2017/0140231 A1 | 5/2017 | Chen et al. |
| 2018/0137639 A1* | 5/2018 | Zou .................. G06T 7/593 |
| 2019/0147602 A1 | 5/2019 | Tao et al. |
| 2019/0265038 A1 | 8/2019 | Ashbrook |
| 2020/0005468 A1 | 1/2020 | Paul et al. |
| 2020/0019802 A1 | 1/2020 | Krishnan |
| 2020/0175326 A1 | 6/2020 | Shen et al. |
| 2020/0265590 A1 | 8/2020 | Daniilidis et al. |
| 2020/0348755 A1* | 11/2020 | Gebauer ............. G06V 10/764 |
| 2020/0394418 A1 | 12/2020 | Liu et al. |
| 2020/0410272 A1* | 12/2020 | Seo ................... G06T 7/20 |
| 2021/0001862 A1 | 1/2021 | Senechal et al. |
| 2021/0318558 A1* | 10/2021 | Tzvieli ............... G02B 27/0176 |
| 2021/0377465 A1* | 12/2021 | Mandelli ............ G06V 20/52 |
| 2021/0382316 A1* | 12/2021 | Gupta ................ G02B 27/0093 |
| 2022/0172486 A1* | 6/2022 | Nakagawa .......... H04N 5/2357 |

FOREIGN PATENT DOCUMENTS

| | | |
|---|---|---|
| WO | WO2019145516 A1 | 8/2019 |
| WO | WO2019145578 A1 | 8/2019 |
| WO | WO2019180033 A1 | 9/2019 |
| WO | WO-2021174106 A1 * | 9/2021 |

OTHER PUBLICATIONS

D. Gehrig, H. Rebecq, G. Gallego, and D. Scaramuzza, "EKLT: Asynchronous photometric feature tracking using events and frames," Int. J. Comput. Vis., 2019. (Year: 2019).*

M. Liu and T. Delbruck, "Adaptive time-slice block-matching optical flow algorithm for dynamic vision sensors," in British Mach. Vis. Conf. (BMVC), 2018. (Year: 2018).*

Gallego, G., Delbruck, T., Orchard, G., Bartolozzi, C., Taba, B., Censi, A., . . . & Scaramuzza, D. (2019). Event-based Vision: A Survey. arXiv preprint arXiv:1904.08405. (Year: 2019).*

A. Linares-Barranco et al., "Low Latency Event-Based Fiitering and Feature Extraction for Dynamic Vision Sensors in Real-Time FPGA Applications," in IEEE Access, vol. 7, pp. 134926-134942, 2019, doi: 10.1109/ACCESS.2019.2941282. (Year: 2019).

Angelopoulos, Anastasios & Martel, Julien & Kohli, Amit & Conradi, Jorg & Wetzstein, Gordon "Event Based, Near Eye Gaze Tracking Beyond 10,000Hz", 2020.

Barua, S., Miyatani, Y. and Veeraraghavan, A, "Direct face detection and video reconstruction from event cameras", in IEEE Winter conference on applications of computer vision (WACV) (pp. 1-9). IEEE, 2016.

Bharath et al.: E-TLD—Long-Term Object Tracking: "Long-term object tracking with a moving event camera", 2018, 12 pages.

Chen, G., Hong, L., Dong, J., Liu, P., Conradt, J. and Knoll, A., 2020. EDDD: Event-based Drowsiness Driving Detection through Facial Motion Analysis with Neuromorphic Vision Sensor. IEEE Sensors; Journal.

Clady, Xavier et al. "A Motion-Based Feature for Event-Based Pattern Recognition." Frontiers in neuroscience vol. 10 594. Jan. 4, 2017, doi:10.3389/fnins.2016.00594 (Year: 2017).

Gehrig, D., Gehrig, M., Hidalgo-Carrio, J. and Scaramuzza, D., "Video to Events: Recycling Video Datasets for Event Cameras", IEEE Conference on Computer Vision and Pattern Recognition (CVPR), Seattle, 2020, pp. 1-10.

He, Huang, Chang-Wei, Li, Lingling & Antu, Guo, TF-YOLO: An Improved Incremental Network for Real-Time Object Detection,. Applied Sciences 9(16):3225, Aug. 2019, pp. 1-16.

Jin, M., Meishvili, G., Favaro, P. "Learning to Extract a Video Sequence from a Single Motion-Blurred Image", rXiv:1804.04065v1 [cs.CV] Apr. 11, 2018, pp. 1-9.

Lenz, G., Leng, S.H. and Benosman, R., "Event-based Face Detection and Tracking in the Blink of an Eye", rXiv:1803.10106v3 [cs.CV] Apr. 2, 2019, 9 pages.

Lenz, G., Leng, S.H. and Benosman, R, "High Speed Event-based Face Detection and Tracking in the Blink of an Eye", arXiv preprint arXiv:1803.10106, 2018, 8 pages.

Muhammad Haris, Greg Shakhnarovich, and Norimichi Ukita, "Deep Back-Projection Networks for Single Image Super-resolution", arXiv: 1904.05677v1, [cs.CV], Apr. 4, 2019, pp. 1-13.

Pan, L, Scheeriinck, C., Yu, X., Hartley, R., Liu, M., Dai, Y. "Bringing a Blurry Frame Alive at High Frame-Rate with an Event Camera" arXiv: 1811.10180v2 [cs.CV] Nov. 27, 2018, pp. 1-14.

Posch, C, Serrano-Gotarredona, T., Linares-Barranco, B., & Delbruck, T. "Retinomorpyic event-based vision sensors: bioinspired cameras with spiking output", Proceedings of the IEE, 102(10, 1470-1484, (2014).

Rebecq, H., Ranfti, R, Koltun, V. and Scaramuzza, D., "High speed and high dynamic range video with an event camera", in IEEE Transactions on Pattern Analysis and Machine Intelligence, 2019, pp. 1-26.

Reinbacher, C, Graber, G, Pock, T. "Real-Time Intensity-Image Reconstruction for Event Cameras Using Manifold Regularisation", arXiv:1607.06283v2 [cs.CV] Aug. 4, 2016, pp. 1-12.

Scheerlinck, C., Barnes, N., Mahony, R. "Continuous-time Intensity Estimation Using Event Cameras," zrXiv: 1811.003881 [cs.CV] Nov. 1, 2018, pp. 1-23.

Scheerlinck, C., Rebecq, H., Gehrig, D., Barnes, N., Mahony, R and Scaramuzza, D., 2020, "Fast image econstruction with an event camera", in IEEE Winter Conference on Applications of Computer Vision (pp. 156-163).

Stec, Piotr: "Event-Sensor Camera", U.S. Appl. No. 16/674,378, filed Nov. 5, 2019.

Zaharia, et al.,: "Event Camera Hardware" U.S. Appl. No. 17/016,133, filed Sep. 9, 2020.

\* cited by examiner

EVENT DETECTOR AND METHOD OF
GENERATING TEXTURAL IMAGE BASED
ON EVENT COUNT DECAY FACTOR AND
NET POLARITY

CROSS-REFERENCE TO RELATED APPLICATIONS

This application is a continuation of U.S. patent application Ser. No. 17/037,420, filed. Sep. 29, 2020, which is a continuation-in-part of U.S. patent application Ser. No. 16/941,799, filed Jul. 29, 2020, which is a continuation-in-part of U.S. patent application Ser. No. 16/904,122, filed Jun. 17, 2020, each of which is incorporated by reference herein in its entirety.

FIELD

The present invention relates to a method for producing a textural image from event information generated by an event camera.

BACKGROUND

Imaging with conventional cameras uses a frame-based approach, in which all pixels in an image sensor measure light falling upon them for a given period of time and report their values to image processing circuitry in a synchronous manner. Textured image information for a scene being imaged by the camera is therefore directly available from the image sensor to the image processing circuitry, whereas some post-processing of successively acquired images is required to determine if any objects are moving within a scene.

Cameras based on event-sensors such as disclosed in Posch, C, Serrano-Gotarredona, T., Linares-Barranco, B.,& Delbruck, T. "Retinomorphic event-based vision sensors: bioinspired cameras with spiking output", Proceedings of the IEEE, 102(10), 1470-1484, (2014), European Patent No. EP3440833, PCT Application WO2019/145516 and PCT Application WO2019/180033 from Prophesee are based on asynchronously outputting image information from individual pixels whenever a change in pixel value exceeds a certain threshold—an event. Thus, pixels in an "event camera" report asynchronous "event" streams of intensity changes, characterised by x, y location, timestamp and polarity of intensity change.

Events may be generated potentially as fast as the clock cycle for the image sensor and the minimum period of time within which an event may occur is referred to herein as an "event cycle".

Event cameras therefore depart from standard fixed frame rate sampling cameras and measure brightness changes for each pixel independently. Event cameras offer several significant advantages over conventional cameras including i) high temporal resolution (order of microseconds), ii) high dynamic range (140 dB against standard camera 60 dB) and iii) low power consumption.

Event cameras naturally respond to edges in a scene which can simplify the detection of lower level features such as key points and corners. As such, they should be naturally suited to object detection.

For example, event cameras could be particularly useful in driver monitoring systems (OMS) which attempt to locate a driver's face and facial features such as their eyes within a field of view of a camera.

The high temporal resolution of event cameras enables some advanced OMS functionalities beyond the capabilities of standard frame-based cameras. These include low latency eye tracking, blink analysis, faster detection and potentially even crash assessment. Moreover, the high dynamic range of >120 dB supports accurate driver detection under dynamic and extreme lighting conditions.

When employing an event camera, it can still be desirable to reconstruct a textural (or spatial) image using a set of events accumulated over a given time. For example, when a face is being imaged, a reconstructed textural image can be used to determine characteristics such as eye gaze or eye state, such as blink or open, as described in PCT Application WO2019/145578 (Ref: FN-630-PCT), the disclosure of which is incorporated hereby by reference. (It will also be appreciated that wherever spatial image information is available, spectral image information can also be generated.)

There are two main NN-based event camera reconstruction methodologies: E2VID and Firenet discussed in Scheerlinck, C., Rebecq, H., Gehrig, 0., Barnes, N., Mahony, R. and Scaramuzza, D., 2020, "Fast image reconstruction with an event camera", in IEEE Winter Conference on Applications of Computer Vision (pp. 156-163).

The Firenet architecture from Scheerlinck et al is shown in FIG. 1 below and this is slightly smaller than E2VID and thus preferred for embedded applications such as OMS. The main components of the reconstruction architecture are gated recurrent cells, G1, G2, that incorporate information from previous timestamp. The inputs to the network are voxel grids, shown on the left of FIG. 1 as "event tensor". This is essentially a 2D representation where events are shared among a specific number of bins, for example, 5, based on their timestamp. Events occurring in a most recent event cycle are placed in bin 1 whereas oldest events will be in bin 5. As a result, they preserve some temporal information.

It is known that when a given number of events has accumulated, then a textural image of a given resolution can be reconstructed.

However, if movement is occurring in a region of a field of view other than caused by an object of interest, then event information which does not contribute to the quality of the reconstruction will diminish the quality of re-construction.

On the other hand, when an object is necessarily moving (so that it might be detected by an event camera), it may not be possible to detect the location of the object from instantaneous event information alone.

There are few if any datasets for face and eye detection for event cameras and existing research relies on handcrafted features or reconstructing intensity-based images and then applying existing algorithms for example, as described in:

Lenz, G., leng, S. H. and Benosman, R., "High Speed Event-based Face Detection and Tracking in the Blink of an Eye", arXiv preprint arXiv:1803.10106, 2018;

Barua, S., Miyatani, Y. and Veeraraghavan, A., "Direct face detection and video reconstruction from event cameras", in IEEE Winter conference on applications of computer vision (WACV) (pp. 1-9). IEEE, 2016; and Rebecq, H., Ranftl, R., Koltun, V. and Scaramuzza, D., "High speed and high dynamic range video with an event camera", in IEEE Transactions on Pattern Analysis and Machine Intelligence, 2019.

SUMMARY

According to a first aspect of the present invention there is provided a method for producing a textural image from event information generated by an event camera according to the claims.

Embodiments can employ a reconstruction buffer with a spatio-temporal capacity dependent on the dynamics for a region of interest (ROI) being tracked. Once a required number of events have accumulated from within the ROI, an integrated frame comprising those events is created and fed through a reconstruction unit, for example a recurrent neural network (RNN) to generate texture information for the ROI.

The buffer may comprise a sliding window covering a specific number of potential event cycles for a ROI, so fast moving ROI may be limited to providing the required number of events in a relatively short number of event cycles, whereas slower moving ROI may use event information acquired over a greater number of event cycles.

If a sufficient number of events has not occurred in a given sliding window, it is assumed that the state of the ROI, for example, face/eyes, have not changed and thus, reconstructing a new texture image is not warranted.

A separate buffer can be used for different ROIs and so the resulting texture image can provide varying framerates for respective regions of interest within a scene. Thus, faster moving ROIs will be reconstructed at a faster rate and vice versa. The reconstruction of each ROI can be done at a desired resolution (i.e. actual size or smaller, depending on the resolution desired by the downstream task).

In embodiments, a Gated Recurrent-"You Only Look Once" (GR-YOLO) architecture is employed to simultaneously generate region proposals and classify objects in event space. YOLO obtains bounding box coordinates and class probabilities directly from pixel information for a given image.

Embodiments of the present invention provide a neural network based method for detecting objects including a face and eyes in event space.

These embodiments can be employed in driver monitoring systems (DMS) for locating a driver's face and other facial features. In a DMS setting, the face and facial features are the key regions of interest (ROI) and require more attention than other regions of the scene.

The motion of ROIs, such as, face, eye lids and pupils may differ significantly, making it useful to be capable of operating at independent temporal resolutions for respective ROIs. As such, embodiments provide reconstruction of textural information at varying frame rates and resolutions from events for scenes with disproportionate dynamics between different regions of interest.

Embodiments enable a foveated rendering of a ROI being imaged by an event camera, where rendering workload is reduced by reducing the image quality in peripheral or background regions.

Embodiments are capable of generating textural image information from event camera data in spite of a fading or decaying effect associated with event camera information. So referring to FIG. 2, where a DMS system is attempting to track a user's facial features and their hand is moving within the field of view of the camera, event information (top right) from their hand will tend to dilute event information from the camera so affecting the quality of image re-construction (top left). On the other hand, embodiments of the present invention which are capable of detecting ROIs bounding the face and eyes (bottom right) can reconstruct the face and eyes at the required speed, quality and resolution against a background which is of less importance (bottom left) with significantly reduced computational cost.

According to a second aspect of the present invention, there is provided a method of detecting a blink according to the claims.

According to a third aspect of the present invention, there is provided a method of detecting a blink according to the claims.

According to a fourth aspect of the present invention, there is provided a method of tracking an object according to the claims.

According to a fifth aspect of the present invention, there is provided a method for producing a textural image from event information generated by an event camera according to the claims.

BRIEF DESCRIPTION OF THE DRAWINGS

Embodiments of the invention will now be described, by way of example, with reference to the accompanying drawings in which.

DESCRIPTION OF THE EMBODIMENTS

Figure 3:
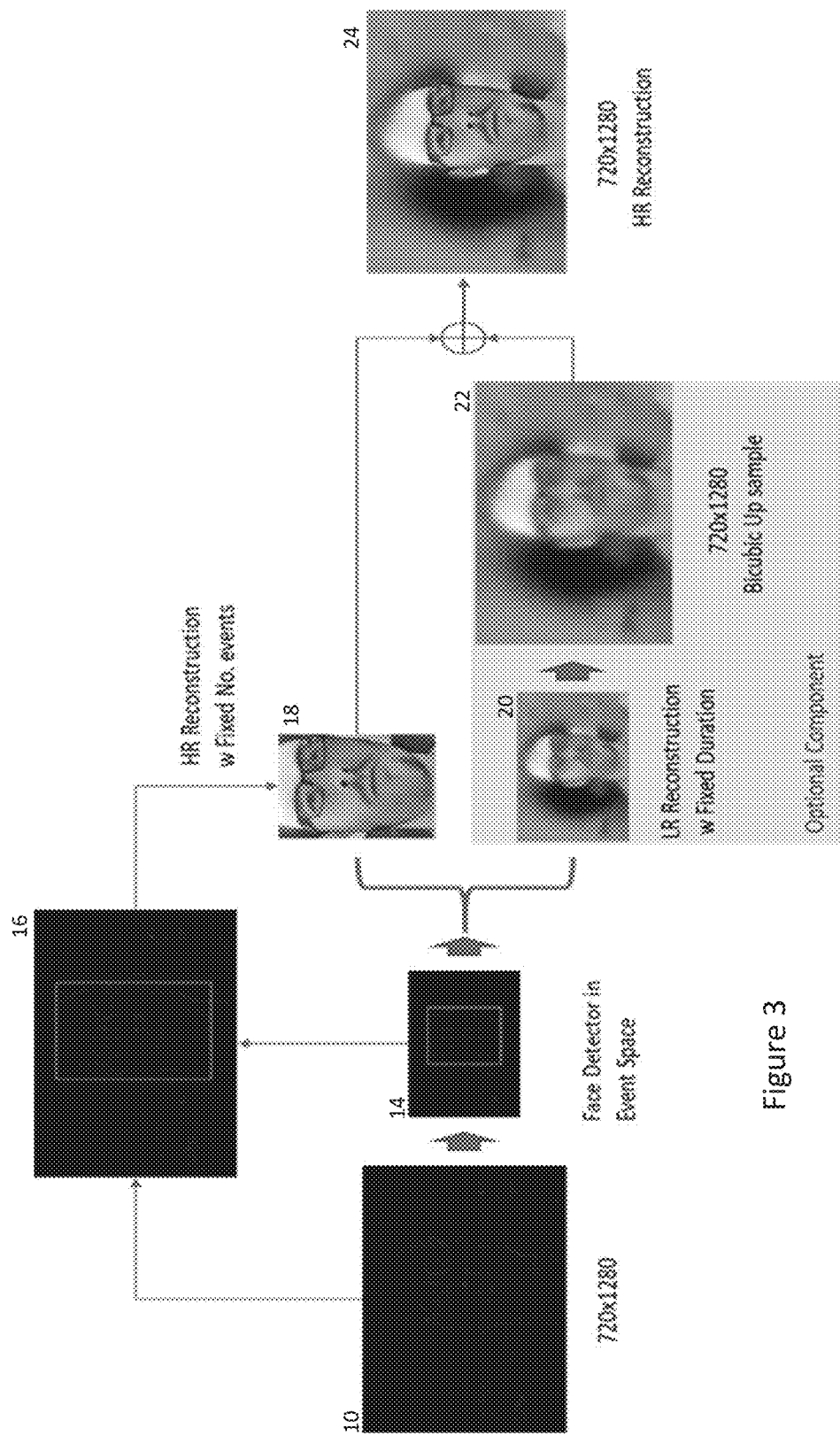
FIG. 3 illustrates a processing pipeline according to a first embodiment of the present invention.

Referring now to FIG. 3, there is shown a flow diagram illustrating the operation of a first embodiment of the present invention.

In the embodiment, an event camera 10, for example, such as available from Prophesee with a pixel resolution of 720×1280 provides event information across of field of view in which an object such as a face including one or more eyes may be present. As discussed, within any given event cycle, event information may only be provided from a limited number of pixels, typically around the edges of the object features.

In the example, events from a monochrome (intensity) event camera are shown and it will be appreciated that such a camera can be sensitive, for example, to visible wavelength light or to near infra-red NIR light where such image information is required.

Equally, embodiments of the invention can be extended operate with multi-plane RGB, RGB-IR or RGB-W event information provided from variants of the camera 10.

The first task performed in the processing pipeline is to respond to this event information and to update the size and location of any object being tracked. In FIG. 3, a face detector 14 provides a bounding box for the most likely size and location of a face within the field of view of the event camera 10. The face detector 14 can also provide bounding boxes for each of the eyes and any other facial features which need to be tracked—although these are not shown in FIG. 3.

An exemplary face detector 14 will be described in more detail below, but in any case bounding box information produced by the face detector 14 is provided to a facial feature reconstruction unit 16.

Figure 1:
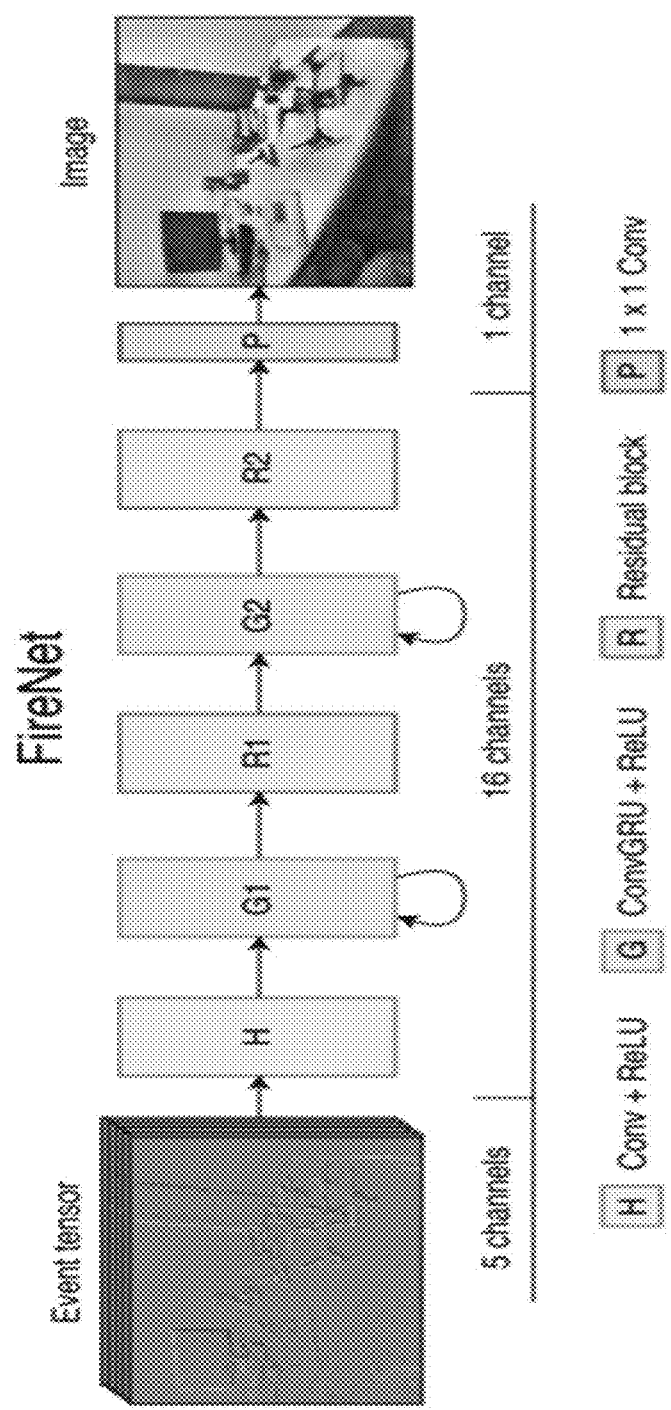
FIG. 1 illustrates an exemplary Firenet network architecture for reconstructing a region of interest from within image from an accumulated number of events generated by an event camera.
Figure 2:
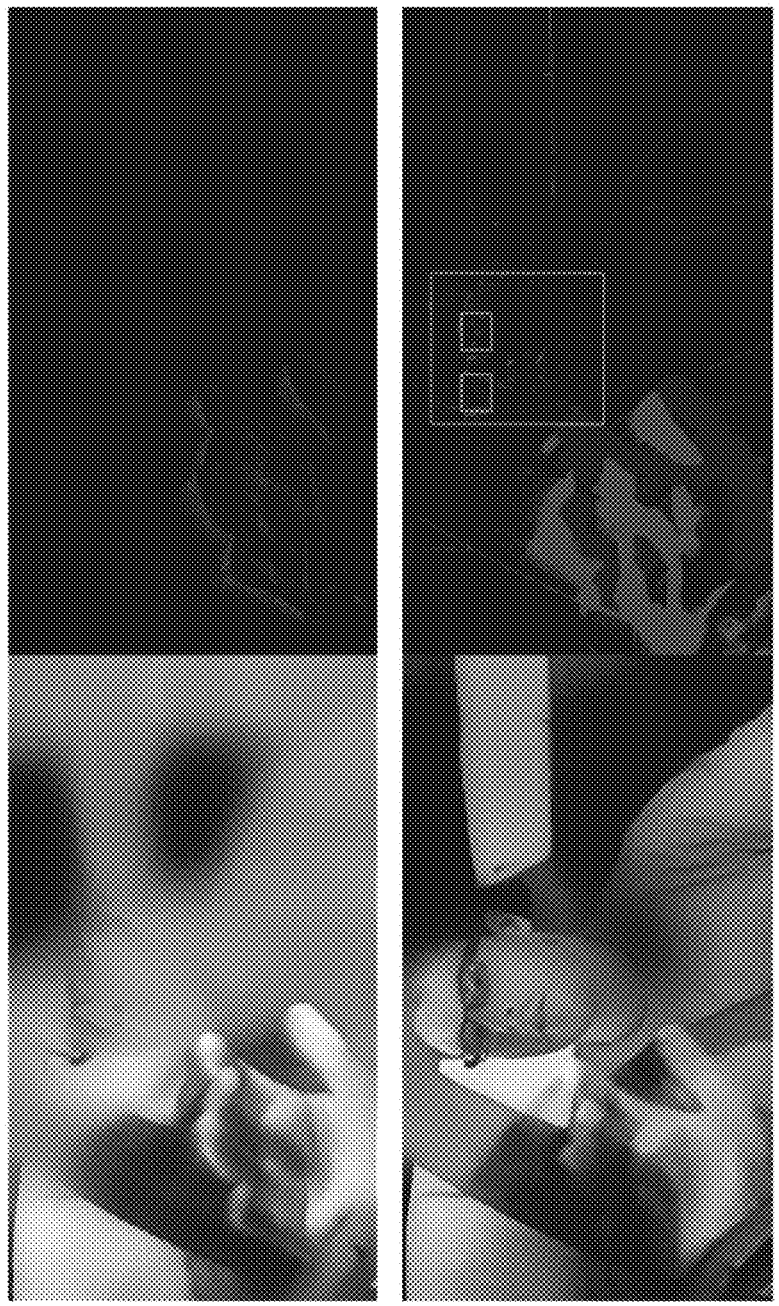
FIG. 2 illustrates a decaying or fading effect (top) due to the motion of a driver's hand, where face reconstruction relies on accumulating enough events (based on the current criteria of fixed number of events) to reconstruct a face and a corresponding textural image (bottom) generated according to an embodiment of the present invention.

In one embodiment, the reconstruction unit 16 waits for a given count of events to occur in the vicinity of the respective bounding box for each of any detected face and eyes and once this threshold is met, the unit 16 can reconstruct texture information 18 for the bounding box, for example, using the recurrent neural network (RNN) such as disclosed in Scheerlinck et al and described in relation to FIG. 1. Note that the threshold used could vary and be proportional to the size of the bounding box so that a similar quality of reconstructed texture information could be provided for objects of different sizes.

In an alternative embodiment, the unit 16 could wait for a given number N of event cycles before attempting to reconstruct texture information 18 for the bounding box. In this case, event information would be drawn from a rolling window of N event cycles with event information from temporally distant event cycles becoming redundant.

These implementations could be combined by requiring a given count of events to occur with a given number N of event cycles before reconstructing texture information 18 for the bounding box; or alternatively the reconstruction unit could either attempt to reconstruct texture information 18 whenever a given count of events occurs in the vicinity of the respective bounding box or within N event cycles of having last reconstructed texture information 18—whichever occurs first.

For a large face region and a 720×1280 pixel event camera, a count of between 5000 and 20000 events within a previous N=5 event cycles can provide sufficient detail to reconstruct the texture information 18 for the face within the bounding box. For eye regions, fewer events may be required and according to the sharpness required for the texture image, the events may be drawn from fewer or more recent event cycles.

While the approach described in Scheerlinck et al comprises one method for the unit 16 to reconstruct texture information 18 for the bounding box, it does involve the processing of a number of convolutional layers: H, G1, R1, G2, R2 and P as shown in FIG. 1 and so limits the minimum latency and maximum rate at which the texture information 18 can be updated.

Other approaches which can be used to reconstruct texture information 18 for the bounding box without using convolutional layers include:

Complementary filter (CF) disclosed in Scheerlinck, Cedric, Nick Barnes, and Robert Mahony, "Continuous-time intensity estimation using event cameras", Asian Conference on Computer Vision. Springer, Cham, 2018; and Manifold regularization (MR) disclosed in Reinbacher, Christian, Gottfried Graber, and Thomas Pock, "Real-time intensity-image reconstruction for event cameras using manifold regularization", arXiv preprint arXiv:1607.06283 (2016).

In a still further embodiment of the present invention, an improved non-convolutional method can be used both to reconstruct texture information 18 for the bounding box, but also to reconstruct texture information for the entire field of view of the event camera; or possibly only background portions of the field of view outside the bounding box as required.

In particular, the method is concerned with constructing texture information from a stream of events captured by the event camera 10 while avoiding motion blur in the constructed image.

Figure 14:
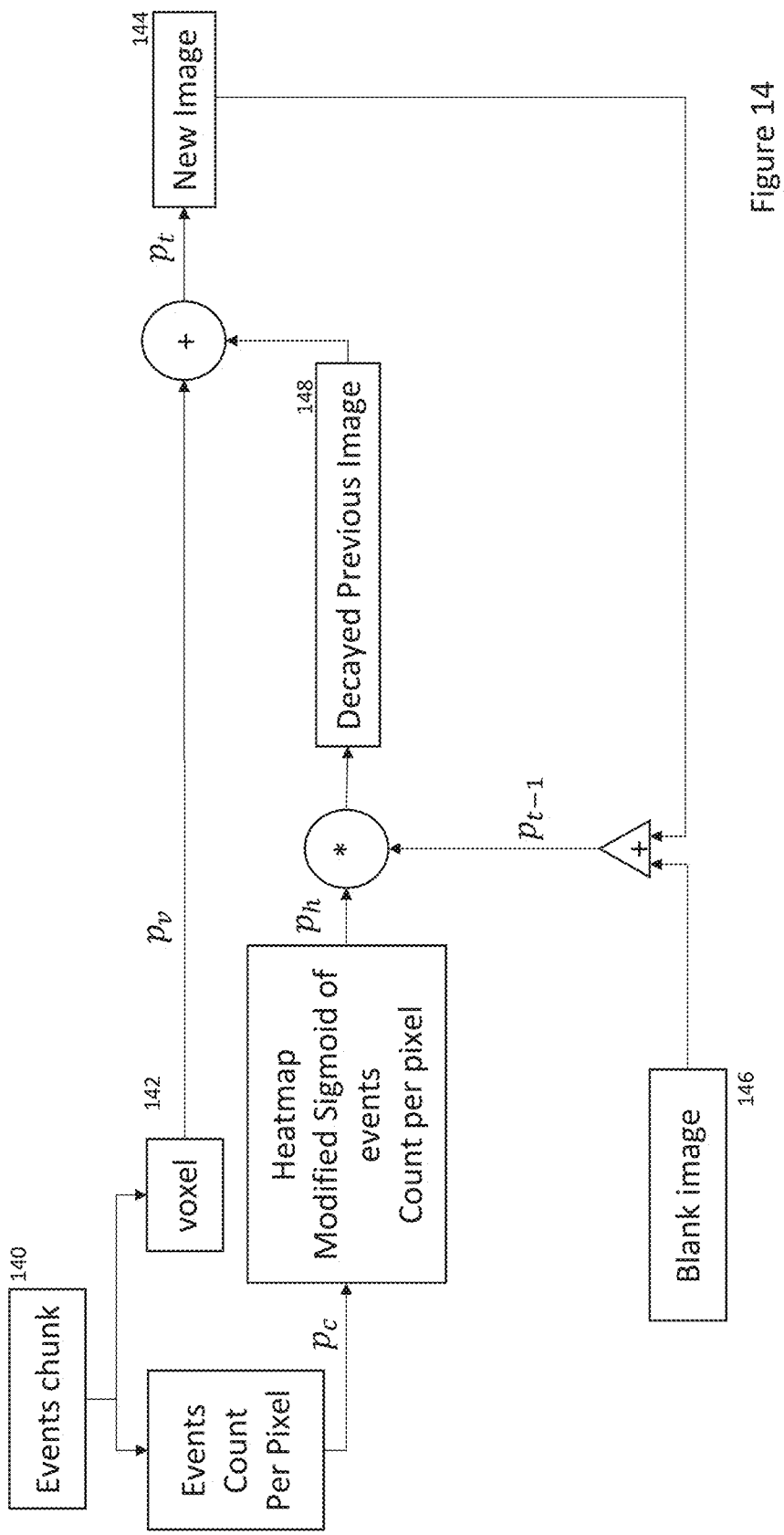
FIG. 14 illustrates a method for producing a textural image from event information generated by an event camera according to an embodiment of the invention.

Referring now to FIG. 14, the method accumulates event information 140 provided by the event camera 10 for a time window comprising either: a fixed or maximum number of event cycles; or a fixed number of events occurring within a region of interest or for the entire field of view of the event camera according to which is to be reconstructed.

In the illustrated embodiment, event information 140 for a time window is accumulated in a voxel 142. Where a time window extends for more than one event cycle, it is possible for more than one event to occur at any given pixel location. As such, an accumulated motion value for each pixel can comprise an accumulation of event polarities occurring at the same pixel during a time window and so comprises a net polarity. This net polarity of each pixel location for an output image is provided as a motion map NO for the current time window. In the embodiment, event information 140 is analysed to provide a count map $P_c(i,j)$ of the number of events occurring per pixel position of the output image 144 during the time window.

It will also be appreciated that where the event camera has a higher resolution than a desired resolution of the output image 144, some spatial binning will be involved in mapping event camera information to the motion map $P_v(i,j)$ and the count map $P_c(i,j)$ for the time window and so net polarity can arise both from either temporal or spatial binning.

U.S. patent application Ser. No. 17/016,133 entitled "Event Camera Hardware" filed on 9 Sep. 2020 (Ref: FN-668-US) the disclosure of which is herein incorporated by reference discloses improved hardware for providing an image frame which can be used as the voxel grids within the tensor disclosed by Scheerlinck and shown in FIG. 1. This hardware can be used directly to produce $P_v(i,j)$ for any given time window in the present embodiment. Furthermore, the hardware can be expanded to keep a count of events for each output image pixel during the time window and so produce $P_c(i,j)$ directly for any given time window, so avoiding the need to explicitly generate and analyse the voxel 142 locally.

In the embodiment, the count map $P_c(i,j)$ is converted into a heat map $P_h(i,j)$ determining the degree to which a previous output image $P_{t-1}$ should be decayed when determining the current output image $P_t$.

The conversion uses an equation generally of the form:

$$P_h(i,j) = g(p_c(i,j)) * \text{heatmap}_{max}$$

where
$P_h$: heatmap pixel value
$P_c$: count grid pixel value
$g(\cdot)$: is a function mapping values in a range between [0, ∞[ to a range [0,1[
$\text{heatmap}_{max}$: max value allowed in heatmap One exemplary equation based on a modified sigmoid function is as follows:

$$P_h(i,j) = 2\left(1 - \frac{1}{1 + e - fpc(i,j)}\right) * \text{heatmap}_{max}$$

where
f: cutoff frequency.

Typical values for f are in the region of 0.5. This works well for a window including about 5000 events. For windows accumulating greater numbers of events, then higher cut off frequencies can be used so tending to decay previous images faster.

In an ideal sensor $\text{heatmap}_{max}$ would be 1, whereas in a typical sensor which produces noise, $\text{heatmap}_{max}$ should be less than 1, the value should nonetheless be close to 1 and a typical value is 0.99.

Thus, using the exemplary figures, $P_h$ range from 0.99 for pixels with no events in a given window (so substantially retaining their existing value), to approximately 0.75 for pixels with one event, down to less than 0.01 for pixels with more than 10 events in a given time window.

Variants of the above equations are of course possible, but what they have in common is that the greater the count value at any pixel location, the greater a decay factor that will be applied to a previous output image $P_{t-1}$ which has been accumulated over one or more previous time windows in calculating a current output image $P_t$.

Thus pixels which are subject to greater motion in a current window will tend to reduce the influence of previous texture information generated at that location during previous windows; whereas pixels which have not been involved in generating any events during a current window will tend to remember their previous state for the current output image $P_t$.

In the embodiment, the output image 144 begins as a blank image 146, where each pixel may have a 0 value in a range from 0 to 255 or it may start at a mid-grey value 127, so allowing the output image to both increase and decrease in brightness as event information is received. In any case, all pixel values begin equal and vary thereafter in accordance with motion detected by the event camera 10.

The immediately previous version of the output image $P_{t-1}$ is multiplied by the heatmap $P_h$ to produce a decayed version 148 of the previous image $P_{t-1}$. The output image $P_t$ is then calculated by adding the motion map values to the decayed previous image $P_{t-1}*P_h$. This output image is then used as the previous image $P_{t-1}$ for the next time window.

The method relates a per pixel decaying (forgetting) factor $P_h*P_{t-1}$ with motion $P_v$. Each output image pixel has its own decay factor for each time window. The per pixel decay factor depends on number of events occurring at the pixel. The higher the number of events, the higher the motion and consequently the bigger the decay factor should be.

It will be appreciated that the above described method requires low computation power and can readily produce output images at a rate of 200 FPS for 1280×720 frames, while still performing better than other methods in terms of quality of output image.

Note that as the bounding box size and location do not need to be especially accurate, the face detector 14 may operate in a down-sampled space with events from multiple camera pixels being binned together as will be explained in more detail below, whereas the reconstruction unit 16 can operate at the same pixel resolution as the event camera, 720×1280.

It will be appreciated that during the course of accumulating the required count of events before reconstructing the texture information 18 for a ROI, the ROI of interest may shift. Thus, events which occurred around the periphery of the ROI may contribute to the count of accumulated events, but not the final texture information because they might at that instant lie outside the ROI. Similarly, events from a previous event cycle which then occurred outside the ROI may fall within the ROI in the event cycle at which the count is reached. It will be appreciated that as the count is approximate, such variability does not affect the end result greatly. Nonetheless, it will be appreciated that the buffer used for accumulating event information for the ROI needs to be suitably sized to accommodate for movement of the ROI during the course of accumulating the event information which will be used to generate the texture information 18.

Once the reconstructed texture information 18 is available it can be used for a variety of applications.

For example, if desired, the reconstructed texture information can be superimposed on texture information for the background 20 to create a complete textural image 24 for the field of view, with a high resolution in the regions of interest and less detail for the background.

FIG. 3 shows that once a threshold number of events from outside the face region have been detected; or alternatively simply at a relatively slow fixed duration, this event information can be used to generate the background texture 20, again for example using the technique disclosed in Scheerlinck et al and described in relation to FIG. 1.

As the background may be relatively motionless and because its illumination level may be constant, it can be useful to only attempt to generate the background texture 20 at low resolution and then to upsample this to provide the texture information 22 at the required resolution for construction of the image 24. Simple bicubic upsampling may be employed, but in other embodiments, either simpler bilinear upsampling could be used or alternatively other non-linear forms of neural network based super-resolution could be employed, for example Deep Back-Projection Network (DBPN) such as disclosed by Muhammad Hans, Greg Shakhnarovich, and Norimichi Ukita, "Deep Back-Projection Networks for Single Image Super-resolution", arXiv:1904.05677v1, [cs.CV], 4 Apr. 2019.

It will also be appreciated that where the background remains constant for longer than a specified period of time, techniques such as disclosed in U.S. application Ser. No. 16/674,378 (Ref: FN-654-US) can be used to cause a change in the light field incident on the surface of the event-sensor and to generate a set of events from pixels distributed across the surface of the event-sensor where this might otherwise have not happened.

As will be seen, the background image 22 may include low quality texture information for the region of interest. When generating the final reconstructed image 24, the texture information 18 can either be directly superimposed on the background information 22 perhaps with some blending around the periphery or the texture information 18 and background information 22 within the ROI can be combined using an averaging or any other suitable function.

Referring back to the face detector 14, in one embodiment, the face (and eye) detector 14 is based on the YOLOv3-tiny network, disclosed in He, Huang, Chang-Wei, Li, Lingling & Anfu, Guo, "TF-YOLO: An Improved Incremental Network for Real-Time Object Detection". Applied Sciences 9(16):3225, August 2019 modified to include a fully convolutional gated recurrent unit (GRU) layer. Nonetheless, it will be appreciated that in variants of the exemplary embodiment other forms of long short-term memory (LSTM) layer than the GRU layer could be used.

An exemplary network architecture is shown in the table below:

ring in the vicinity of a reference frame pixel, the simple +/− polarity indicators provided by the event camera can convert into potential real valued scalars.

Similar to the technique disclosed in Scheerlinck et al and described in relation to FIG. 1, events from a number of event cycles are accumulated until a threshold number of events for the entire reference frame have occurred. Although, in this case rather than dividing the events into separate time-based channels, they are aggregated into a single channel. The number of events which triggers the network 14 can differ from the number of events determining when the reconstruction unit 16 attempts to reconstruct texture information 18 and will typically be lower.

The GRU is located at layer 14, before a first YOLO detection layer 17, based on empirical performance tests

| LAYER | TYPE | FILTER | KERNEL/ STRID | INPUT | OUTPUT |
|---|---|---|---|---|---|
| 0 | Conv | 16 | 3/1 | 256 × 256 × 1 | 256 × 256 × 16 |
| 1 | Maxpool | | 2/2 | 256 × 256 × 16 | 128 × 128 × 16 |
| 2 | Conv | 32 | 3/1 | 128 × 128 × 16 | 128 × 128 × 32 |
| 3 | Maxpool | | 2/2 | 128 × 128 × 32 | 64 × 64 × 32 |
| 4 | Conv | 64 | 3/1 | 64 × 64 × 32 | 64 × 64 × 64 |
| 5 | Maxpool | | 2/2 | 64 × 64 × 64 | 32 × 32 × 64 |
| 6 | Conv | 128 | 3/1 | 32 × 32 × 64 | 32 × 32 × 128 |
| 7 | Maxpool | | 2/2 | 32 × 32 × 128 | 16 × 16 × 128 |
| 8 | Conv | 256 | 3/1 | 16 × 16 × 128 | 16 × 16 × 256 |
| 9 | Maxpool | | 2/2 | 16 × 16 × 256 | 8 × 8 × 256 |
| 10 | Conv | 512 | 3/1 | 8 × 8 × 256 | 8 × 8 × 512 |
| 11 | Maxpool | | 2/1 | 8 × 8 × 512 | 8 × 8 × 512 |
| 12 | Conv | 1024 | 3/1 | 8 × 8 × 512 | 8 × 8 × 1024 |
| 13 | Conv | 256 | 1/1 | 8 × 8 × 1024 | 8 × 8 × 256 |
| 14 | GRU | 256 | 3/1 | 8 × 8 × 256 | 8 × 8 × 256 |
| 15 | Conv | 512 | 3/1 | 8 × 8 × 256 | 8 × 8 × 512 |
| 16 | Conv | 21 | 1/1 | 8 × 8 × 512 | 8 × 8 × 21 |
| 17 | YOLO | | | 8 × 8 × 21 | 192 × 7 |
| 18 | Route 14 | | | | 8 × 8 × 256 |
| 19 | Conv | 128 | 1/1 | 8 × 8 × 256 | 8 × 8 × 128 |
| 20 | Up-Sampling | | | 8 × 8 × 128 | 16 × 16 × 128 |
| 21 | Route 8 + 20 | | | | 16 × 16 × 384 |
| 22 | Conv | 256 | 3/1 | 16 × 16 × 384 | 16 × 16 × 256 |
| 23 | Conv | 21 | 1/1 | 16 × 16 × 256 | 16 × 16 × 21 |
| 24 | YOLO | | | 16 × 16 × 21 | 768 × 7 |

In the above embodiment an input reference frame size of 256×256 pixels is used.

Layers 0 . . . 13 comprise a series of convolutional and Maxpool layers and focus solely on information in the reference frame. As will be seen, layers 1, 3, 5, 7 and 9 comprise Maxpooling layers, down-sampling the image resolution by a factor of $2^5=32$, resulting in feature maps of size 8×8. (Each cell corresponds to an 8×8 section of the input reference frame.) As such, in this embodiment, the network 14 can be configured can take any input frame size where the width and height are divisible by $2^5$.

For example, in variations of the above embodiment a reference frame of 288×512 could be used as this more closely reflects the aspect ratio of the Prophesee camera and causes less alising in the down-sampling process.

Note that it is also possible to train the network 14 based on reference frames of one size and to deploy the network to process reference frames of another size, as the weights employed within the various layers are the same in any case.

In any case, any difference in event camera resolution and reference frame resolution, requires events occurring at a resolution of 720×1280 pixels to be binned into reference frame pixels. This can be performed using for example nearest neighbour or interpolation, and it will be appreciated that when potentially combining more than one event occurwhilst also minimising network size and complexity, but it will be appreciated that in variants of this network the GRU may be placed at other network locations. In this regard, it will be seen that in the above exemplary network, the memory function provided by the GRU layer 14 affects both YOLO detection layers 14 and 17.

In variants of the above embodiment, layer 18 can be connected back to the output from layer 13 (before the GRU layer 14), so that the GRU layer 14 the only affects the large scale YOLO layer 17, whereas the smaller scale YOLO layer 24 is unaffected by the GRU layer 14. This can allow the YOLO layer 14 to respond to potentially relatively faster displacements of smaller scale features less weighted by the GRU layer 14 memory function.

In still further variants, there could be provided respective YOLO layers connected before and after the GRU layer 14 so that the network would be capable of detecting both faster and slower moving features at any given scale.

In a still further variation, respective GRU layers with different weights and so differently tuned to tracking relatively larger and smaller features can be employed.

The GRU inputs and outputs 256 feature maps. The equations governing fully convolutional GRUs are as follows:

$$z_t = \sigma(W_z * x_t + U_z * h_{t-1})$$

$$r_t = \sigma(W_r * x_t + U_r * h_{t-1})$$

$$\tilde{h}_t = \tan h(W^* x_t + U^*(r \odot h_{t-1}))$$

$$h_t = (1-z_t)h_{t-1} + z_t \tilde{h}_t$$

where * is the convolution operator, ⊙ is the Hadamard product, $X_t$ is the input at time t, $Z_t$ is the update gate, $r_t$ is the reset gate, fit is the candidate activation, $h_t$ is the output, σ is the sigmoid function and $W_z$, $U_z$, $W_r$, $U_r$, W and U are the learnable weights. (Note that t−1 in this case refers to the previous instantiation of the face detector 14.)

If the reference frame does not contain any face information (which is common), latent space information is propagated through the GRU from previous instances of the GRU within previous instances of the face detector 14, enabling the network to "remember" where the face was not only in the immediately previous timesteps (event cycles) providing event information for the input reference frame, but from one or more previous instances of the face detector 14.

Route layers in the above table indicate forward skip connections with feature map concatenation. Layer 14 routes its 8×8 cell, 256 channel output forward to layer 19 without concatenation; while layer 8 routes its output forward to layer 22. In the latter case, this 256 channel output is concatenated with the 128 channels output from previous layer 20 to provide the 16×16 cell, 384 channel input for layer 22.

Preceding the YOLO detection layers 17 and 24, 1×1 convolution layers 16 and 23 are used. The shape of the kernels is 1×1×(B×(5+C)) where B is the number of predicted bounding boxes and C is the number of classes. B is set to 3 and C is 2 (face+eye). That is, the network predicts 3 bounding boxes at each cell.

YOLO detection layers (layers 17 and 24) make predictions on each cell for each box—YOLO layer 17 producing predictions for large scale 16×16 face/eye features and YOLO layer 24 producing predictions for smaller scale 8×8 face/eye features. At each scale, the network makes predictions for each of the 3 anchors over each cell. This amounts to 6 anchors used over the 2 scales.

Note because of the upsampling layer 20 between layer 17 and 24, layers 22-24 tend to be more computationally expensive than layers 15-17. As layer 17 is a terminal output layer, it is possible to execute layers 19-24 conditionally on the results provided by layer 17. Thus, if layer 17 only produced very low probability results, then it may not be seen as worthwhile to execute layers 19-24. Separately, if not operating conditionally and to reduce latency, as layers 19-24 branch from layer 14, it is possible to execute these layers in parallel with layers 15-17 in a multi-core processor of the type disclosed in in PCT Application WO2019/042703 (Ref: FN-618-PCT), the disclosure of which is incorporated herein by reference.

Each YOLO detection layer 17, 24 predicts box coordinates and dimensions, objectness and class probabilities. Objectness and class probabilities reflect the probability that an object is contained within a bounding box and the conditional probability of a class given an object, respectively.

To make bounding box predictions, the YOLO layers 17 and 24 employ anchor boxes, a set of predefined bounding boxes with set heights and widths. Anchors are essentially bounding box priors. They are configured to capture the scale and aspect ratio of the object classes relating to the current dataset and task at hand. As mentioned, at each cell, 3 anchor boxes are used. So, within a cell, a prediction is made for each anchor, based on the 1×1 convolutions explained above. The output is ($t_x$, $t_y$, $t_w$, $t_h$, $t_o$, $p_1$, $p_2$)×B for each grid cell, where $t_0$ reflects objectness i.e. the probability a box contains an object. $p_1$ and $p_2$ represents the probability of each class—in this case face or eye. (In the embodiment, no distinction is made between left and right eyes, but in variants of the embodiment, this could be done.)

Figure 4:
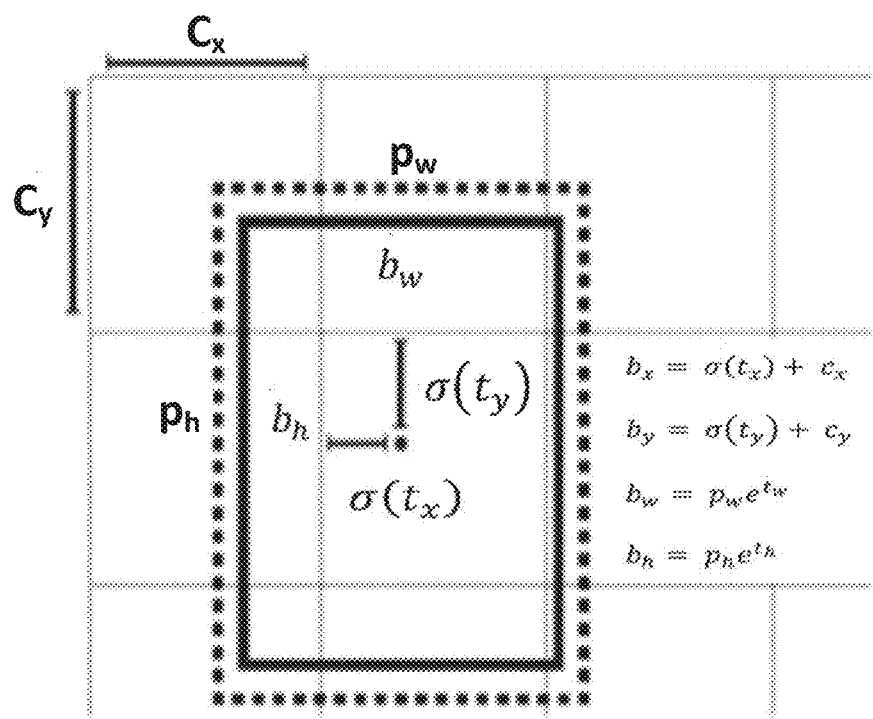
FIG. 4 illustrates the output from a YOLO layer within the face detector of the pipeline of FIG. 3.

As will be seen from the table, input to the YOLO detection layers 17, 24 comprises 21 feature maps: 7×3=21. The 3 relates to the 3 anchor boxes. The 7 relates to x, y centre coordinates, height, width, objectness and 2 class probabilities predicted from the previous 1×1 convolution. With reference to FIG. 4, the equations below describe how this output is transformed to bounding box predictions:

$$b_x = \sigma(t_x) + c_x$$

$$b_y = \sigma(t_y) + c_y$$

$$b_w = p_w e^{t_w}$$

$$b_h = p_h e^{t_h}$$

where ($b_x$, $b_y$, $b_w$, $b_h$) represent bounding box centre x, y coordinates, width and height, σ signifies the sigmoid function, $p_w$, and $p_h$ are bounding box prior width and height and $c_x$ and $c_y$ are the coordinates of the top left corner of the grid cell. Rather than predict absolute width and height, the model predicts width and height ($t_w$ and $t_h$) as log transforms or offsets to these predefined anchors. Offsets are applied to anchors boxes to create new width and height predictions.

Dimensions are predicted by applying log-space transformations and subsequently multiplying by anchors. Centre coordinate predictions ($t_x$ and $t_y$) represent offsets relative to the top left corner of each cell ($c_x$ and $c_y$). The centre coordinates are transformed using a sigmoid function to force the output between 0-1 and within the cell. Objectness predictions ($t_0$) are also passed through a sigmoid function and interpreted as a probability.

The two network layers 17, 24 produce ((8×8)+(16×16))×3=960 predictions. Typically, there is only 1 face and 2 eyes in the field of view and so further filtering of the predictions is employed to provide the final bounding box for each of the face and eyes. Filtering is first performed based on abjectness scores. Boxes with low abjectness probabilities (i.e. <0.6) are removed. In one implementation, non-maximum suppression is then used to further filter overlapping detections of the same object.

The above described network 14 can maintain the face and eye locations over a long period of time when no face information is available.

As a network performing the task of the face detector network 14 has not been made available before, the required large event based dataset required for training the face detector 14 is not readily available, but it can be generated from textural image datasets—either monochrome or RGB. Where a static image dataset such as the Helen dataset (http://www.ifp.illinois.edu/vuongle2/helen/) is employed, video sequences can be generated from these images by applying a set of random transformations and augmentations each image, simulating homographic camera motion with 6-DOF. Alternatively, video datasets such as the 300VW dataset can be employed.

Figure 5:
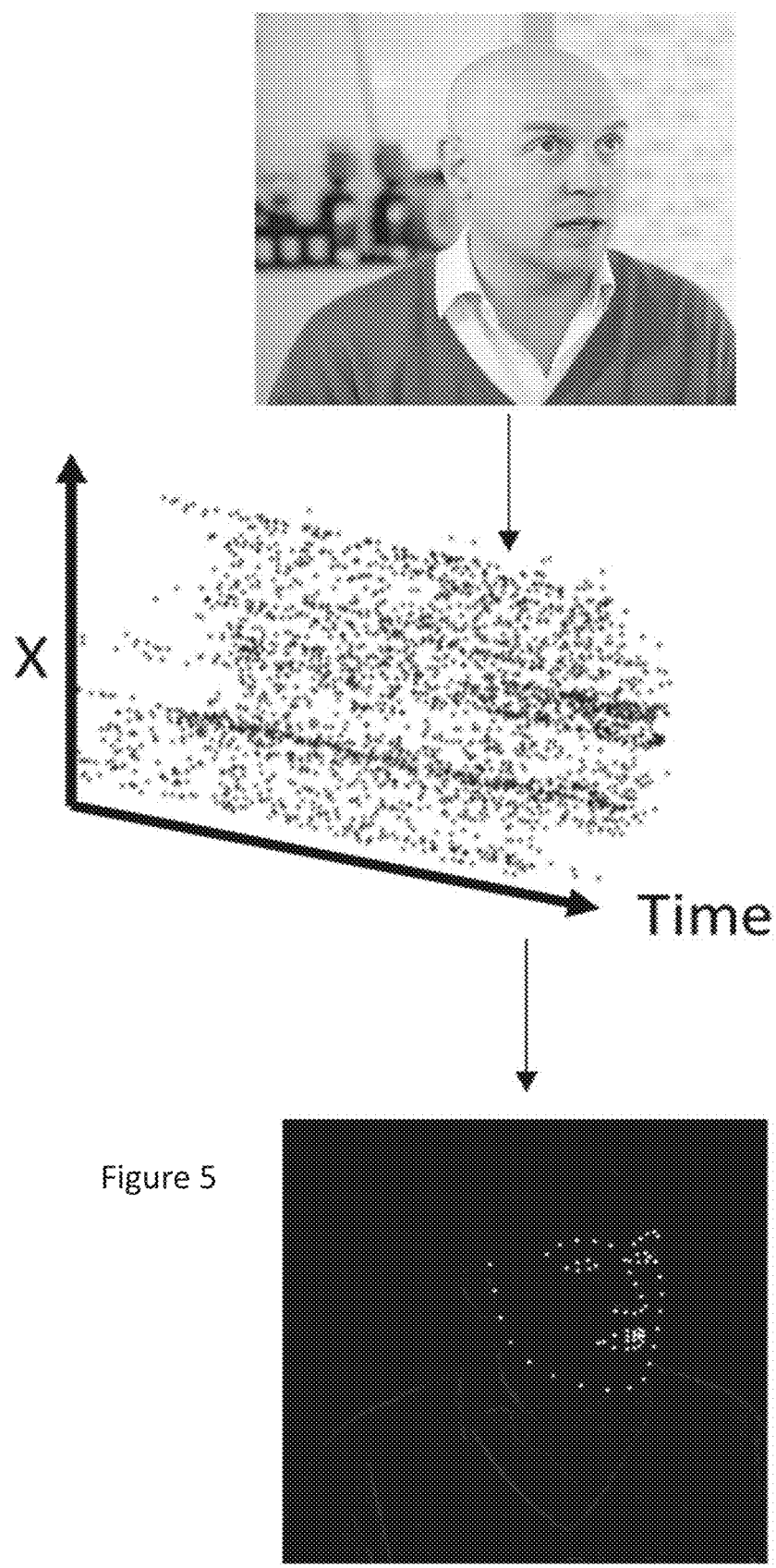
FIG. 5 illustrates a) an image (Intensity, RGB or NIR) from a sequence of images being converted into b) corresponding events and c) those accumulated events subsequently converted over the sequence of images into an integrated event frame with labelled landmarks.

Gehrig, D., Gehrig, M., Hidalgo-Carrio, J. and Scaramuzza, D., "Video to Events: Recycling Video Datasets for Event Cameras" have proposed a framework for converting any existing video datasets to event datasets, mapping labels from the former to the latter. However, they do not explicitly refer to facial landmarks or bounding boxes. They demonstrate their framework for object recognition and sematic segmentation tasks. In any case, facial landmarks defining the outline of the face and eye features such as eyebrows and eyelids which can be determined within the textural images can now be mapped through into event space as shown in FIG. 5 and used for training.

As will be appreciated, in the embodiment of FIG. 3, event information is used directly in the face detector 14 to identify a ROI in event space containing a face as well as ROIs containing facial features such as eyes.

Figure 6:
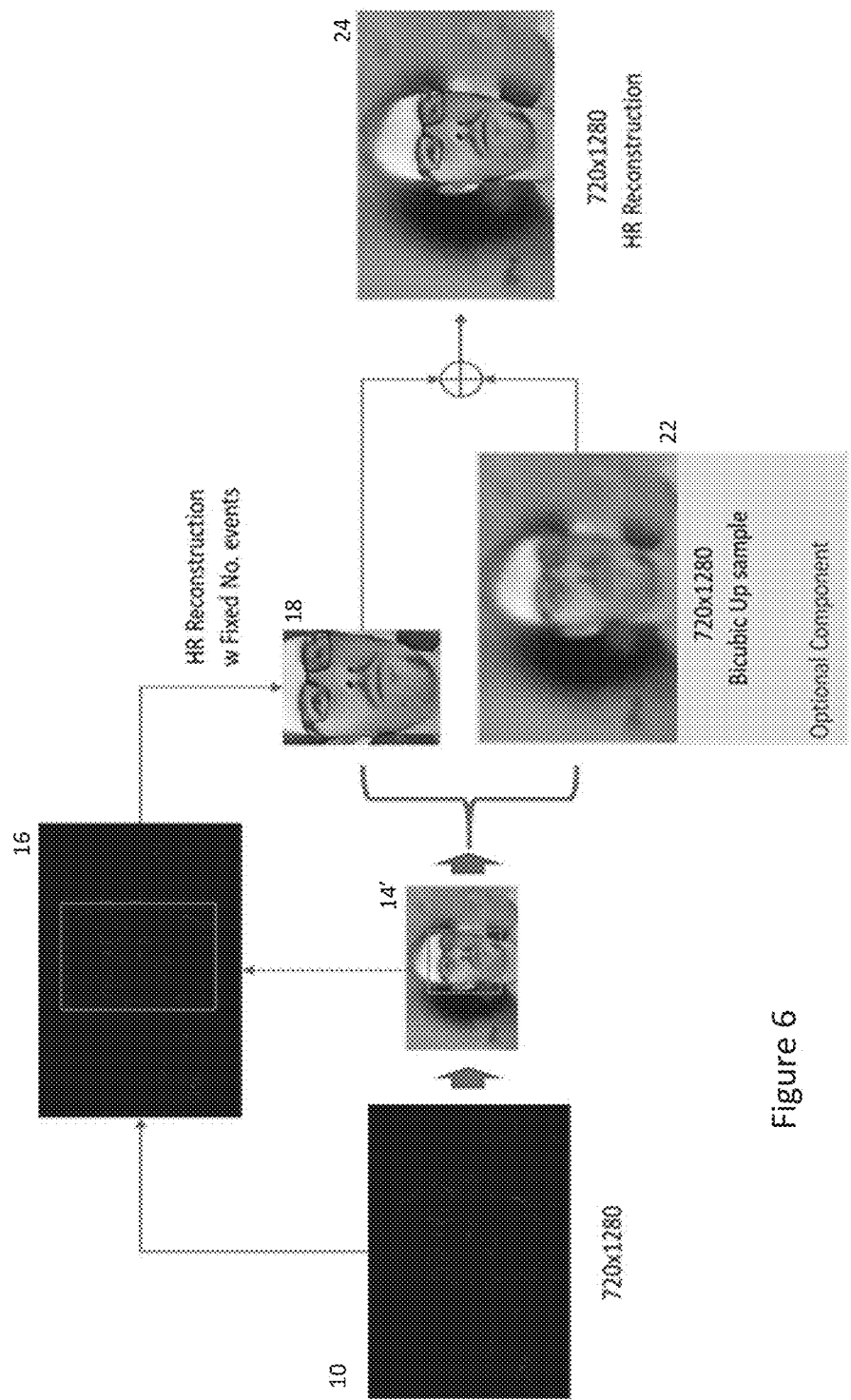
FIG. 6 illustrates an alternative processing pipeline according to a second embodiment of the present invention.

FIG. 6 shows a variation of the embodiment of FIG. 3 where like reference numerals relate to similar functionality. In this case, a face detector 14' is applied to a low resolution reconstructed image of the scene, similar to the textural image 20 generated in the embodiment of FIG. 3. In this case, the face detector 14' can comprise any conventional form of face detector based on either classical Haar classifiers or neural network based classification designed for intensity-based images.

It will be appreciated that using this approach, the face detector 14' may be slower to respond to changes in location of the face and/or eyes and so this reason, the bounding boxes chosen for each may not tightly frame the features as much as in the embodiment of FIG. 3. On the other hand, a greater variety of scale may be available from some conventional classifiers so potentially providing a better fit in some cases.

In any case, the face detector 14' again provides the bounding box information to the reconstruction unit 16 which produces the textural information 18 for the bounding box(es) as before.

Again, as before, the low-resolution textural image 20 of the background can be upsampled before being combined with the high resolution textural information 18 for the face (and facial features) to produce the complete textural image 24 for the field of view, with a high resolution in the regions of interest and less detail for the background.

In variants of the above described embodiments, tracking algorithms incorporating Kalman filters can be employed to further refine the tracking of ROIs detected by the face detectors 14,14'.

Note that although potentially compact, significant processing is still required to execute an instance of the face detector 14, 14'. As such, the face detector 14, 14' may not execute at the same frequency as event cycles. Nonetheless, this may not be necessary as the frequency at which the face detector 14, 14' executes need only be sufficient to track movement of a region of interest. On the other hand, as soon as the threshold number of events and/or event cycles criteria for executing an instance of the reconstruction unit 16 for any given region of interest being tracked is met, this can execute rapidly to provide the required textural information 18 for subsequent analysis.

In variations of the above described embodiments, event information from within the bounding box for a region of interest can be used directly for other applications in addition or as an alternative to reconstructing the textural information 18. For example, in the case of regions of interest indicated by the face (feature) detector 14, 14' to contain eyes, the polarity of events output by event cameras, where positive and negative polarities indicate an increase or decrease in pixel intensity above a predefined threshold, is particularly suited to the detection of rapid movements such as blinks which generate a significant number of events within the eye regions. (Note that where blink detection is the sole application, it would not be necessary for the detector 14, 14' to provide a bounding box for a face.)

Chen, G., Hong, L., Dong, J., Liu, P., Conradt, J. and Knoll, A., 2020. EDDD: Event-based Drowsiness Driving Detection through Facial Motion Analysis with Neuromorphic Vision Sensor. IEEE Sensors Journal propose a drowsiness detection system using event cameras comprising locating eye and mouth regions and extracting relevant features related to these regions for drowsiness classification. Detection is performed through a two-stage filtering process to remove events unrelated to these regions. Blinks are detected based on the event number spikes across the full processed image.

Angelopoulos, Anastasios & Martel, Julien & Kohli, Amit & Conradt, Jorg & Wetzstein, Gordon "Event Based, Near Eye Gaze Tracking Beyond 10,000 Hz", 2020 propose a hybrid frame and event-based eye tracking system comprising modelling a 2D parametric pupil representation using both frames and events. The eye model parameters are then mapped to a 3D gaze vector. A blink detector is also employed based on the premise that blinks will deform the fitted eye ellipse.

Figure 7:
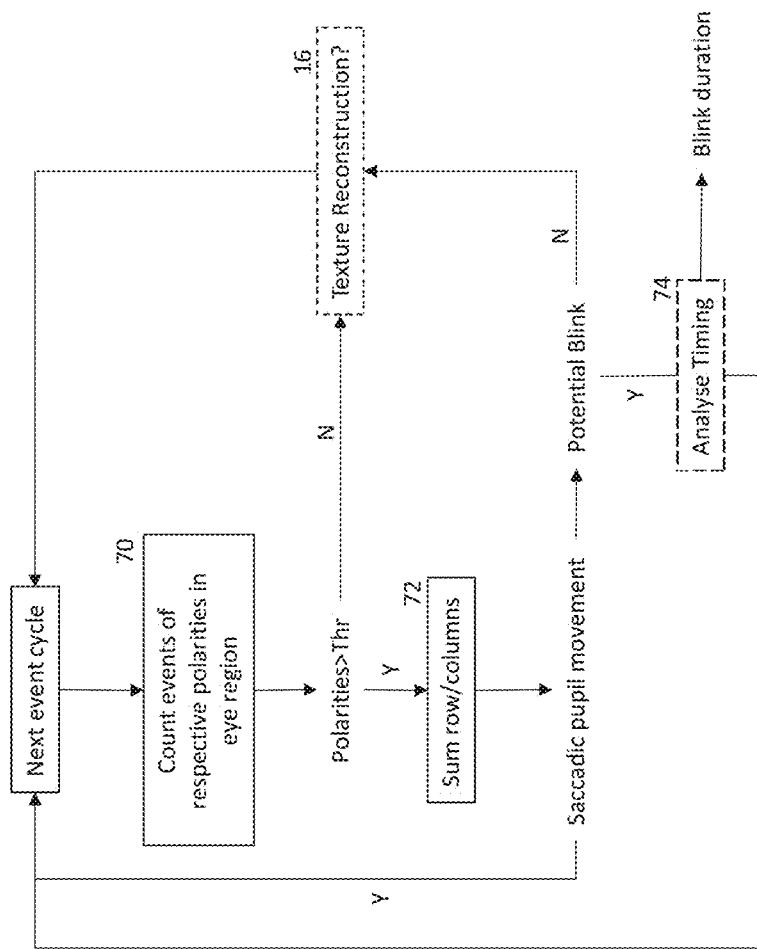
FIG. 7 is a flow diagram of a method for detecting a blink according to an embodiment of the present invention.

Referring now to FIG. 7, in a first implementation of this aspect of the present invention, an event tensor similar to that shown in FIG. 1 is used to accumulate event information for a fixed number of event cycles within the respective bounding box for any eye provided by the detector 14,14'.

This may involve the tensor accumulating more or less than the threshold number of events required to trigger the reconstruction unit 16 to generate textural information 18 for the region of interest, in particular the former, because during a blink, there will be a large number of events and such a count is indicative of the possibility of a blink having begun during the window of event cycles stored in the event tensor.

In a first step 70, a count is taken of positive events within the bounding box and of negative events within the bounding box.

If the number of positive events within the bounding box and the number of negative events within the bounding box each exceed a threshold (or a respective threshold), this can indicate that a blink has begun.

Given that the size of the bounding box may change according to the proximity of a face to the event camera 10, the threshold may need to vary according to the size of the bounding box.

Thus, in a refinement, the count of positive events and the count of negative events are divided by the area of the bounding box and compared to a mean polarity threshold. If each exceeds the mean polarity threshold, this can indicate that a blink has begun.

It will also be appreciated that during a given number of event cycles, both one or more positive and negative events may occur at a given location. In some embodiments, these can each contribute to the respective positive and negative counts; whereas in other embodiments the net polarity per pixel is counted. Thus, a count is taken of all pixels with a net positive polarity, this is divided by the bounding box area and tested to determine if this is above a mean polarity threshold; similarly, all pixels with a net negative polarity are counted, this is divided by the bounding box area and its magnitude tested to determine if this is greater than a mean polarity threshold. If each exceeds the mean polarity threshold, this can indicate that a blink has begun.

The mean polarity threshold can be zero or greater than zero.

It will be appreciated that blinking is one form of movement which can occur in an eye region being tracked—another being pupil movement, in particular saccadic pupil movement. Whereas blinking tends to involve vertical movement, pupil movement tends to have more of a horizontal component. Saccadic pupil movement involves more rapid horizontal movement.

In step 72, candidate blink windows meeting the count criterion of step 70 are tested either to confirm that movement is vertical or to check if movement is horizontal.

This can be performed by summing the values for events occurring in rows or columns of a detected eye region.

If column values are summed, then it can be seen that the positive and negative events generated by a blink will tend to cancel out one another and the sum of column values will be low indicating that a blink has begun. On the other hand, where events are caused by horizontal pupil movement, then the sum of column values will be high. The converse is the case where row values are summed with a low sum being generated by pupil movement and a high sum being generated by a blink.

In one embodiment, once the columns are summed, the standard deviation of the sums is calculated, and this is tested against a threshold. A large standard deviation indicates horizontal pupil motion, and thus saccadic type motion rather than a blink, as the positive and negative polarities are separated horizontally. Such a test therefore removes such frequently occurring horizontal pupil movements that may otherwise have been identified as blinks.

If one or both of these criteria are applied and met at step 72, then a blink can be indicated as beginning during the window of event cycles stored in the event tensor.

One particular use which can be made of detecting a blink occurring during the window of event cycles stored in the event tensor is to signal that in spite of greater than the required threshold number of events occurring within the bounding box for an eye region, it may be undesirable to attempt for the reconstruction unit 16 to generate the textural information 18 for the eye region, as described above, as this may be blurred due to the onset of blinking.

Thus, the quick count tests of steps 70,72 can run before any final decision is made to instantiate the reconstruction unit 16 potentially saving significant processing in reconstructing what may be a blinking eye.

It will also be appreciated that the steps 70,72 do not have to be executed at every event cycle and it may be sufficient to initiate these tests periodically at say 5 ms intervals.

It is also possible to signal to the reconstruction unit 16 that it should not attempt to reconstruct the textural information 18 for the eye region if the test at step 72 indicates that pupil movement has caused the number of events to exceed the required threshold number of events, as for example, saccadic eye movement may cause blurring of such reconstructed textural information.

Figure 8:
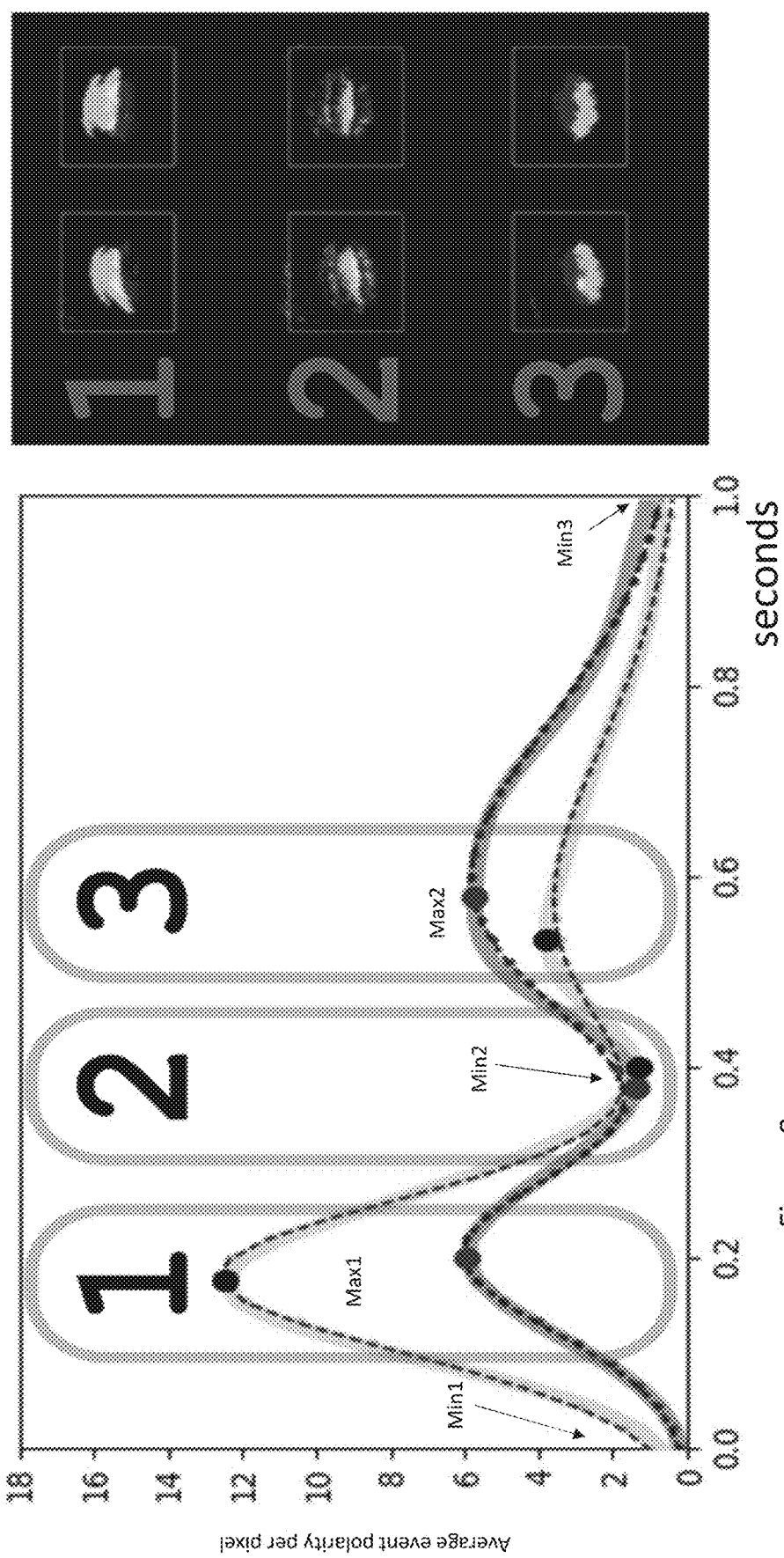
FIG. 8 illustrates the distribution of event polarities during a blink.

Referring now to FIG. 8, in terms of events over time, a typical blink exhibits a bimodal Gaussian distribution of average event polarity per pixel. The onset of a blink is detected at steps 70, 72 described above and will be picked up typically before the first peaks Max1 in positive and negative polarity indicated by the region 1 in FIG. 8. In this case, the upper line indicates higher average positive polarity due to events occurring in the upper part of the eye region shown to the right in FIG. 8, while the lower line is responsive to negative polarity events occurring in the lower part of the eye region. Once such a peak occurs, the trend in aggregate positive/negative polarity events, troughs with minima Min2 in region 2 and peaks again at Max2 with negative polarity exceeding positive polarity in region 3 of FIG. 8. As will be seen, the upward movement with a peak in region 3 is typically longer than the eyelid closing of region 1.

In one embodiment, a measure of average positive and negative peak polarities within the window of event cycles stored in the event tensor is tracked every 5 ms or at 200 fps once the tests of steps 70,72 are met. This data can then be modelled using for example conventional regression analysis to determine the 2 local maxima Max1, Max2 for each set of polarities and 3 local minima Min1, Min2 and Min3.

The duration of the blink is calculated as the time between minima Min1 and Min3; and additional features can also be extracted including eyelid closing/opening duration, eyelid closed time and even speed of a blink.

Of course, if the tracking and modelling of data subsequent to steps 70, 72 does not provide a valid bimodal Gaussian distribution, the timing analysis step 74 can indicate that a blink has not occurred during the analysis window. Nonetheless, it will be appreciated that as a blink can typically take from less than approximately 200 ms to 500 ms, it may not be desirable to wait for the results of the timing analysis step 74 before deciding if texture information reconstruction should be attempted.

Nonetheless, in a driver monitoring system, the duration of a driver's blinking can be used as a measure of their alertness (short) or drowsiness (long) and this can be communicated after the timing analysis step 74 to a vehicle control system to take appropriate action, especially in the case of a driver whose blink duration exceeds a threshold value.

In variations of the above described approach, in step 70 rather than extracting information from a fixed number of event cycles, accumulation of a given number of events occurring in the vicinity of the respective bounding box for each eye can trigger the test for the occurrence of a blink.

Still further variations of the above described approaches to blink detection once a bounding box for an eye region have been detected by face (feature) detectors 14, 14' are also possible.

Referring now to FIG. 9, the spatial distribution of positive and negative polarity events which have accumulated either in the event tensor or until a predetermined number of events has occurred are analysed in order to fit a linear binary classifier (a line) dividing the two groups of events. In this case, it preferred to use net polarity per pixel so that the spatial distribution can be assessed on a simple 2D array of information such as shown in FIG. 9. Nonetheless, in more complicated implementations, the temporal binning of events in the event tensor could be maintained with the fitting process taking this into account when generating the classifier.

In any case, the output of the spatial distribution analysis comprises a line with a slope (and x,y location). In the examples of FIGS. 9(a) and 9(b), during the onset of a blink, the line will tend to have a generally horizontal slope, when the face is in a vertical orientation, so corresponding to an axis running from the medial to the lateral canthus.

Figure 10:
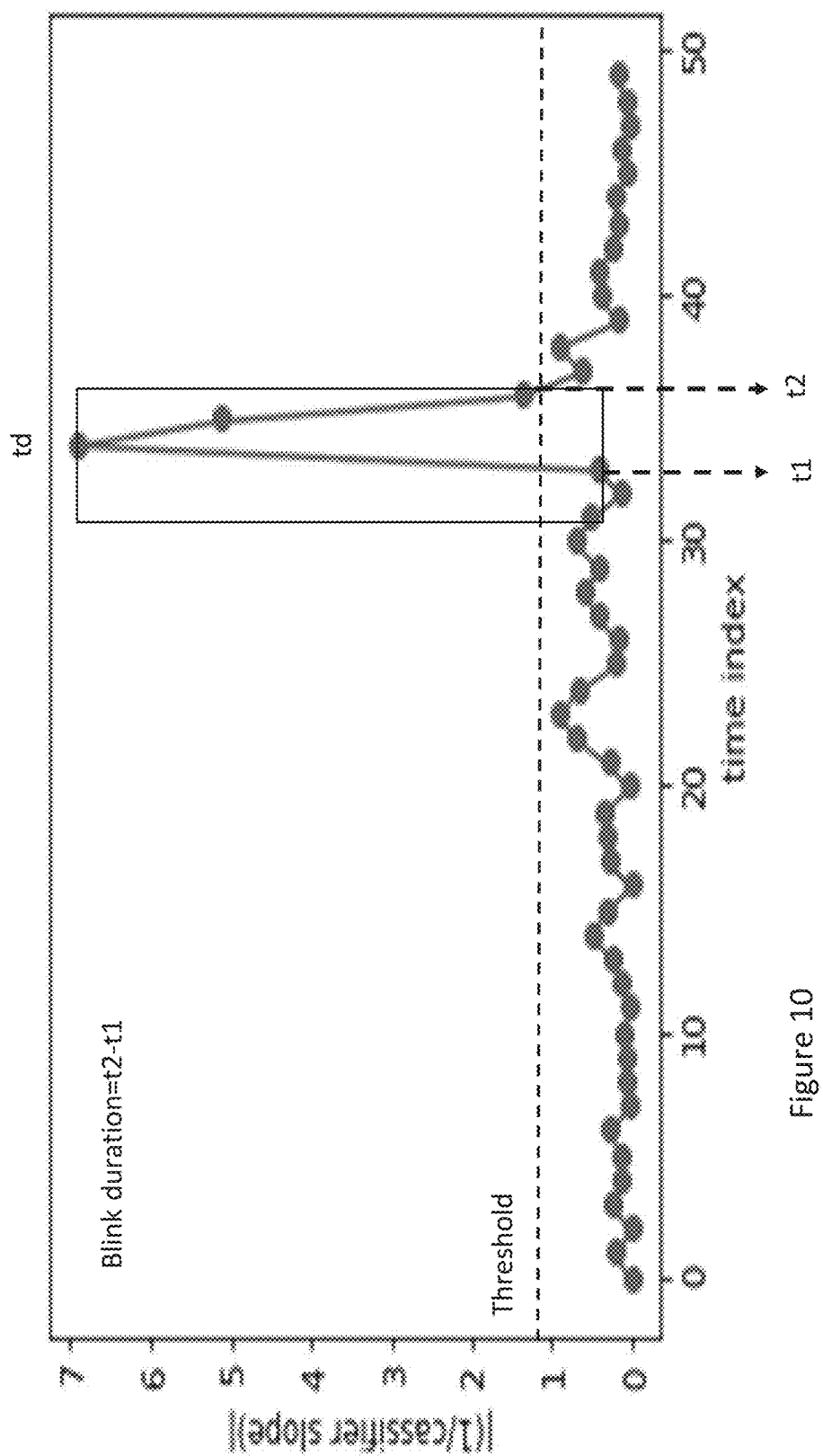
FIG. 10 shows a slope for the linear classifier of FIG. 9 changing during a blink.
Figure 11A:
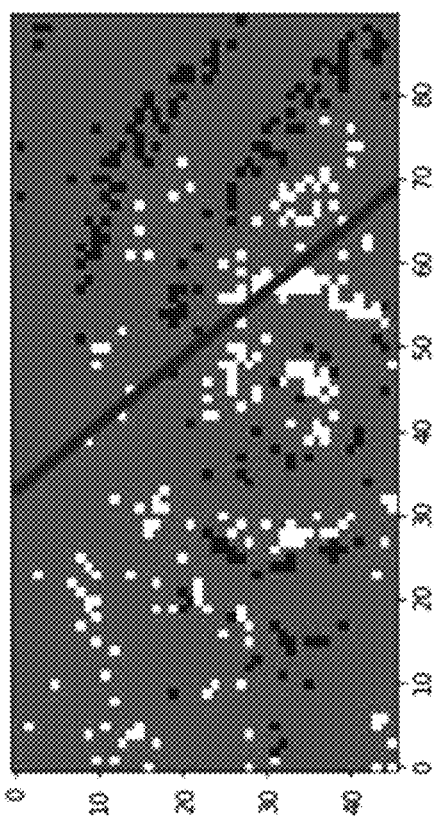
FIG. 11(a)-11(d) illustrates event polarity changes during a sequence of horizontal eye movement.
Figure 11C:
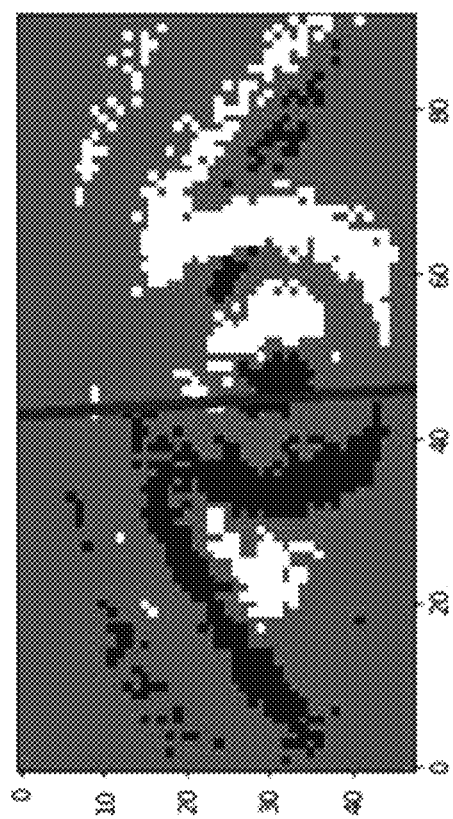
Figure 11B:
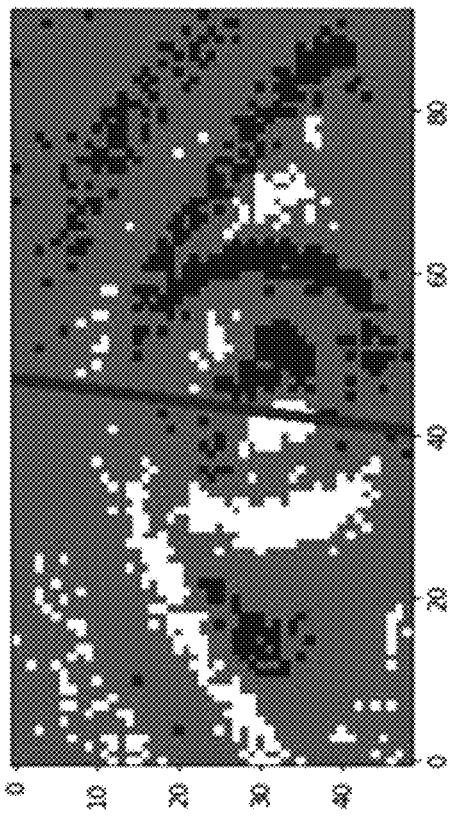
Figure 11D:
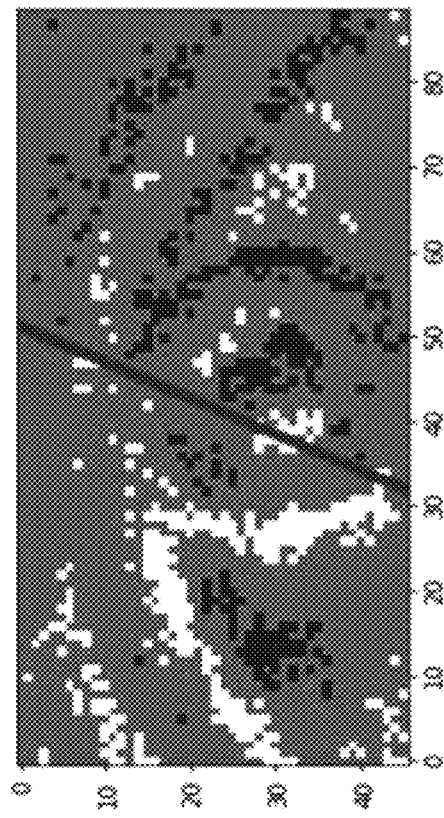

Referring now to FIG. 10, where the inverse of the slope of the line tracked over a period of time is shown. Here it can be seen that a simple threshold can be used to determine the onset of a blink at detection time td. Once the onset of a blink is detected, subsequent periodic analysis can show the blink occurring between times t1 and t2, when the slope was last below the threshold before td and returned to below the threshold after td respectively. Of course, it will be appreciated that, if the slope rather than the inverse of the slope is tracked, a negative comparison can be made to detect when a blink has occurred.

Figure 9C:
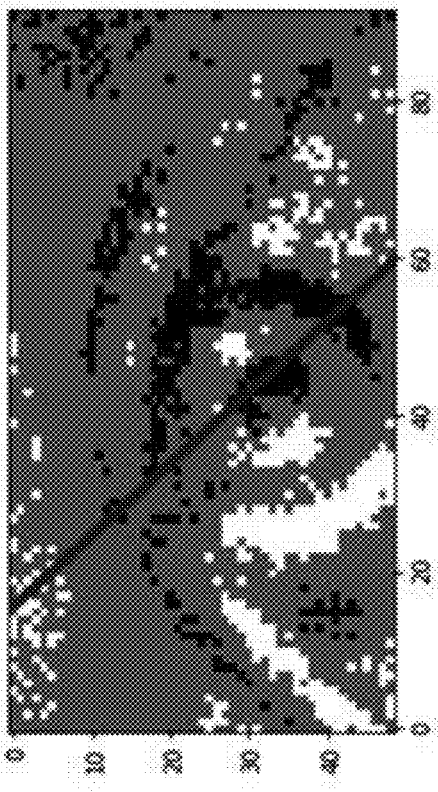
FIG. 9(a)-9(d) illustrates a linear classifier for indicating a blink according to a further embodiment of the present invention.
Figure 9D:
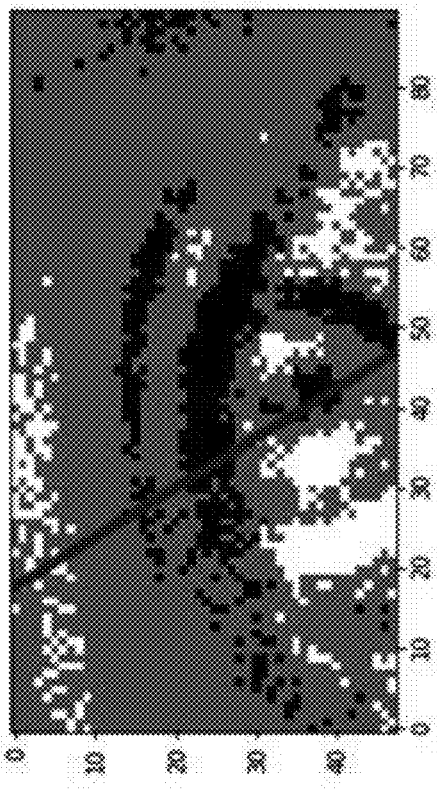
Figure 9A:
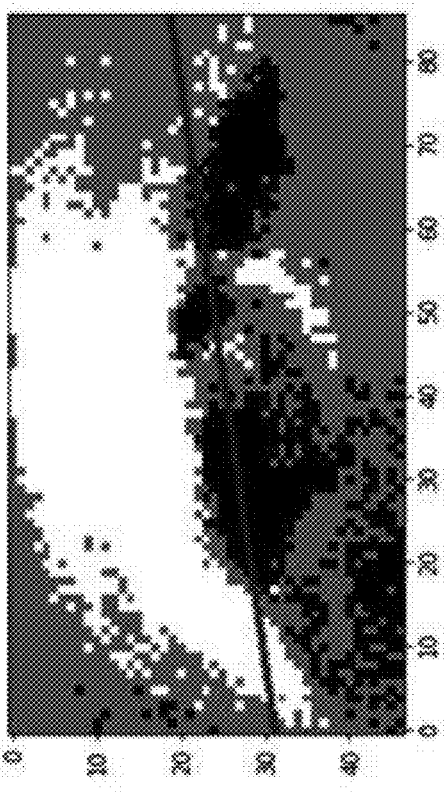
Figure 9B:
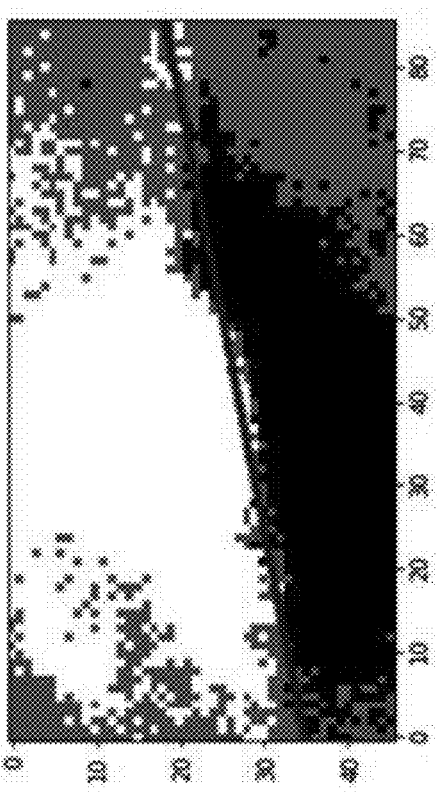

On the other hand, pupil movement such as illustrated in FIGS. 9(c) and 9(d) tends to produce a line with a more vertical slope. When such a line is detected, similar to the timing analysis of step 74 above, the spatial distribution can be periodically analysed and where it is seen that the polarity of events on either side of the line swaps from one side of the eye region to the other, then this period can be classified as involving horizontal pupil movement. FIGS. 11(a) to (d) give an examples of polarity swapping from one side of the classifier line to another in response to saccadic movement of an eye.

It will also be appreciated that the rate of horizontal displacement of the line over time can also be used indicate whether horizontal pupil movement is saccadic or not.

In a still further variation of the example illustrated in FIGS. 9 and 10, event data accumulated at any given time, such as shown in FIG. 9, is split into respective batches of positive and negative polarity events. For each batch, an average x,y location is calculated. (In other variants, a centroid or any other equivalent location representative of the location of the batch could be determined for each batch.) A vector, or a vector perpendicular to the vector, joining the two locations can then be used to indicate whether the event data is indicative of the onset of a blink and this can be periodically analysed to track the movement of the vector to confirm (or not) the presence of a blink or pupil movement.

Figure 12:
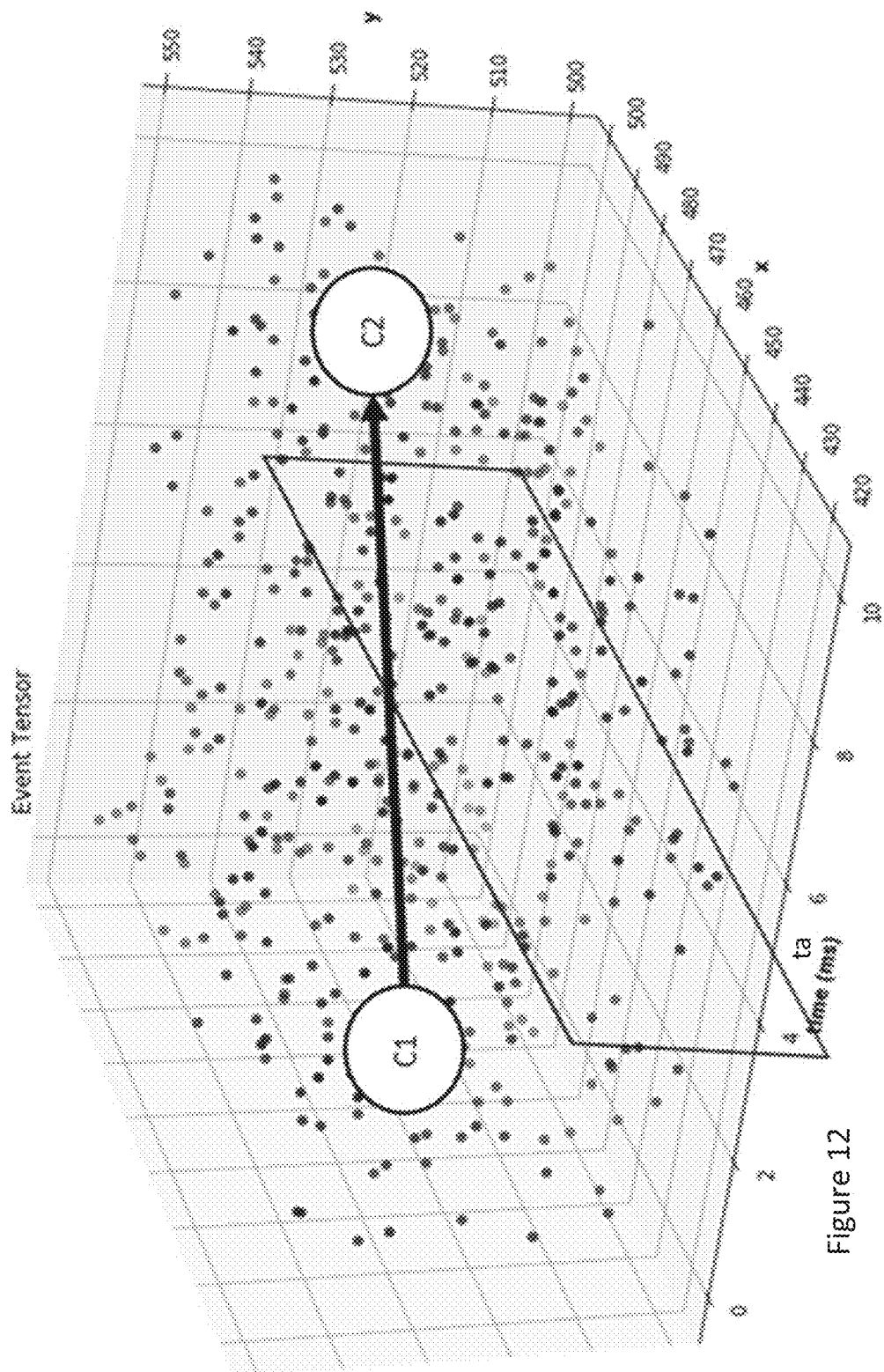
FIG. 12 illustrates the analysis of event data for tracking an object according to a still further embodiment of the present invention.

In a still further variation illustrated in FIG. 12, positive and negative event data, within the eye region (in this case a region with an x,y extent of approximately 90*60 pixels), is accumulated in an event tensor over a period of time (thus the event tensor is divided into at least two channels). The data is divided into respective batches occurring within N event cycles preceding and following a given analysis time ta. For each batch, a centroid x,y location C1, C2, is calculated for each set of events. (Note that in this case, each batch of events will comprise a mix of positive and negative polarity events.) (In other variants, an average or any other equivalent location representative of the location of the batch could be determined for each batch.) This centroid can also be weighted to favour events closer to time ta. An average time $t_{c_1}$, $t_{c_2}$ is also associated with each of the centroids C1, C2.

Figure 13:
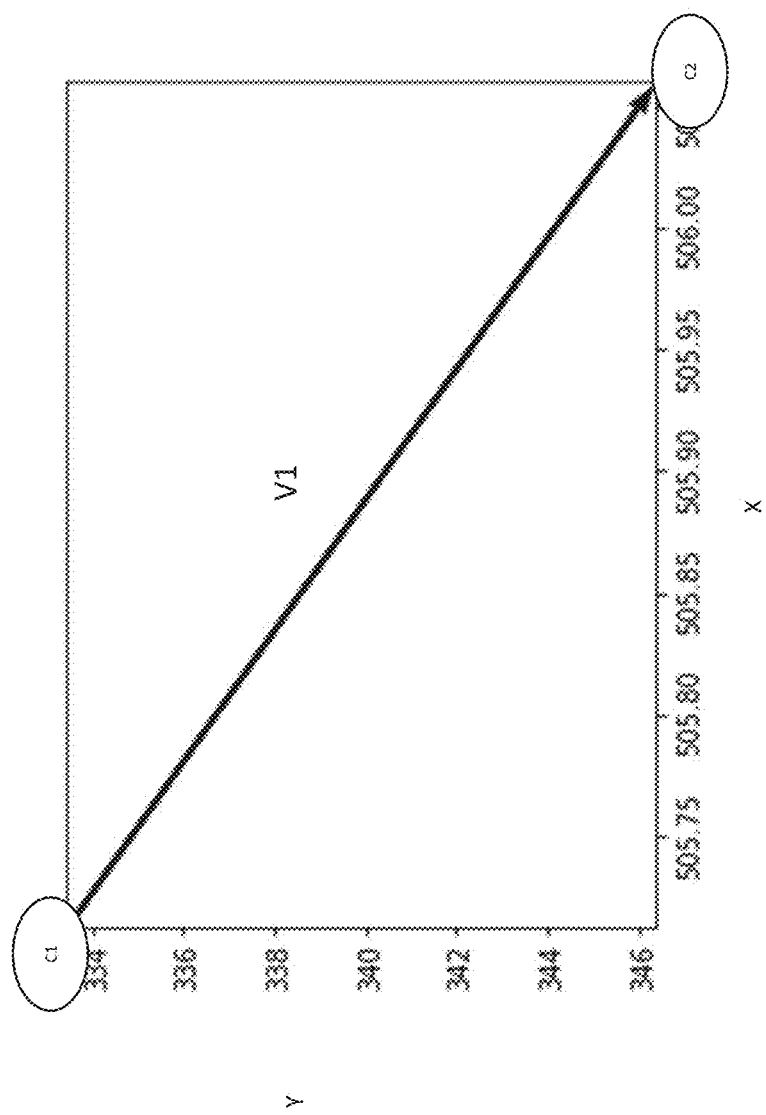
FIG. 13 shows a vector V1 joining representative locations for two batches of event data in two dimensions.

Referring now to FIG. 13, when viewed in the two dimensional coordinate system of the eye region, a vector V1 joining the two locations C1, C2 (not the same as the example in FIG. 12) can then be used to indicate the speed and direction of motion of the pupil indicated by the centroids as follows:

$$\text{speed} = \frac{\|\overline{C_1 C_2}\|}{t_{c_2} - t_{c_1}} \text{ pixels/sec}$$

This speed and direction can be periodically analysed to track the vector and to detect and/or confirm (or not) the presence of a blink, pupil movement or saccadic movement.

Note that the approach of FIGS. 7 and 8 or FIGS. 9 and 10 for detecting the onset of blink can be combined with the approach of FIGS. 12 and 13 for identifying saccadic movement in addition to or as an alternative to the approaches described in relation to step 72 of FIG. 7 and illustrated in FIG. 11. It will be appreciated that the exemplary method described in relation to FIGS. 12 and 13 can be applied to a region containing any single moving object. If a region did contain multiple moving objects, then another module to detect moving object locations would be needed to create filtered events for each moving object. While the above described embodiments have been provided in the context of driver monitoring systems (OMS), it will be appreciated that it can be extended to other applications where tracking object features from information provided by an event camera is of interest.

The invention claimed is:

1. A method comprising:
   accumulating event information from a plurality of events occurring during successive event cycles across a field of view of an event camera, each event indicating an x,y location within said field of view, a polarity for a change of detected light intensity incident at said x,y location and an event cycle at which said event occurred;
   responsive to a selected event cycle, analyzing event information for one or more preceding event cycles to identify a region of interest bounding an eye region; and
   responsive to a threshold event criterion, generating a textural image for the region of interest from event information accumulated from within the region of interest by:
   obtaining a count (pc) of events occurring at each pixel location of an output image in a time window preceding the threshold event criterion; determining a potential absence of a blink within said eye region based at least in part on the count (pc) of events before producing the textural image;
   generating a decay factor (ph) for each pixel location as a function of said count; and
   producing said textural image based on the decay factor (ph) and the count (pc).

2. The method of claim 1, wherein obtaining the count (pc) of events comprises counting events with a positive polarity and counting events with a negative polarity in one or more event cycles preceding the selected event cycle.

3. The method of claim 1, wherein obtaining the count (pc) comprises determining a net polarity per pixel of the eye region in said one or more preceding event cycles and summing net positive polarities and net negative polarities to provide said count.

4. The method of claim 1, wherein determining a potential absence of a blink within said eye region further comprises determining that pupil movement is occurring in said one or more preceding event cycles.

5. The method of claim 1, further comprising determining a net polarity (Pv) of events occurring at each pixel location of the output image in the time window preceding the threshold event criterion.

6. The method of claim 5, further comprising applying said decay factor (ph) to a textural image generated for said region of interest prior to said time window to form a decayed textural image (Pt−1).

7. The method of claim 6, wherein producing said textural image comprises adding said net polarity (pv) of events occurring at each pixel location to corresponding locations of said decayed textural image (Pt−1).

8. The method of claim 7, wherein the decay factor for a pixel Ph(i,j) is calculated according to the following function:

$$Ph(i,j) = g(pc(i,j)) * \text{heatmaprnax}$$

wherein,
Pc(i,j) is a pixel count value;
g(•): is a function mapping values in a range between $[0, \infty[$ to a range $[0, 1[$; and
heatmaprnax is a maximum allowed value.

9. A system comprising:
one or more processors;
an event camera;
memory in communication with the one or more processors, wherein the memory contains instructions configured to cause the one or more processors to:
provide a bounding box for a region of interest in a field of view of the event camera;
accumulate event information from a plurality of events during successive event cycles across a field of view of the event camera, each event indicating an x,y location within said field of view, a polarity for a change of detected light intensity incident at said x,y location and an event cycle at which said event occurred; and
responsive to a selected event cycle, analyze event information for one or more preceding event cycles to identify a region of interest bounding an eye region;
accumulate the event information from the plurality of events occurring during successive event cycles across the field of view of the event camera; and
responsive to a threshold event criterion, generate a textural image for the region of interest from event information accumulated from within the region of interest by:
obtain a count (pc) of events occurring at each pixel location of an output image in a time window preceding the threshold event criterion;
determine a potential absence of a blink within said eye region based at least in part on the count (pc) of events before producing the textural image;
generate a decay factor (ph) for each pixel location as a function of said count; and
produce said textural image based on the decay factor (ph) and the count (pc).

10. The system of claim 9, wherein the system further comprises a recurrent neural network (RNN).

11. The system of claim 9, wherein the instructions are further configured to operate at a same pixel resolution as the event camera.

12. The system of claim 9, wherein the face detector further comprises a convolutional neural network comprising a plurality of layers, a first of said layers being configured to receive said accumulated event information, a successive layer of said convolutional neural network being configured to down sample said accumulated event information into at least one lower resolution feature map comprising an array of cells, at least one intermediate layer being configured to retain information generated by a corresponding layer in a previous instance of said face detector and further comprising at least one transformation layer configured to transform a feature map provided by a previous convolutional layer to generate a respective probability for each down-sampled cell of said feature map comprising an object at a given scale.

13. The system of claim 9, wherein the instructions are further configured to determine a net polarity (Pv) of events occurring at each pixel location of the output image in the time window preceding the threshold event criterion.

14. The system of claim 13, wherein the instructions are further configured to applying said decay factor (ph) to a textural image generated for said region of interest prior to said time window to form a decayed textural image (Pt−1).

15. The system of claim 14, wherein producing said textural image comprises adding said net polarity (pv) of events occurring at each pixel location to corresponding locations of said decayed textural image (Pt−1).

16. A driver monitoring system (DMS) comprising:
one or more processors;
an event camera;
memory in communication with the one or more processors, wherein the memory contains instructions configured to cause the one or more processors to:
provide a bounding box for a region of interest in a field of view of the event camera;
accumulate event information from a plurality of events during successive event cycles across a field of view of the event camera, each event indicating an x,y location within said field of view, a polarity for a change of detected light intensity incident at said x,y location and an event cycle at which said event occurred; and
responsive to a selected event cycle, analyze event information for one or more preceding event cycles to identify a region of interest bounding an eye region;
accumulate the event information from the plurality of events occurring during successive event cycles across the field of view of the event camera; and
responsive to a threshold event criterion, generate a textural image for the region of interest from event information accumulated from within the region of interest by:
obtain a count (pc) of events occurring at each pixel location of an output image in a time window preceding the threshold event criterion;
determine a potential absence of a blink within said eye region based at least in part on the count (pc) of events before producing the textural image;
generate a decay factor (ph) for each pixel location as a function of said count; and
produce said textural image based on the decay factor (ph) and the count (pc).

17. The driver monitoring system of claim 16, wherein the system further comprises a recurrent neural network (RNN).

18. The driver monitoring system of claim 16, wherein the instructions are further configured to operate at a same pixel resolution as the event camera.

19. The driver monitoring system of claim 16, wherein the system comprises a convolutional neural network comprising a plurality of layers, a first of said layers being configured to receive said accumulated event information, successive layer of said convolutional neural network being configured to down sample said accumulated event information into at least one lower resolution feature map comprising an array of cells, at least one intermediate layer being configured to retain information generated by a corresponding layer in a previous instance of said face detector and further comprising at least one transformation layer configured to transform a feature map provided by a previous layer to generate a respective probability for each down-sampled cell of said feature map comprising an object at a given scale.

* * * * *